US012741551B1

(12) United States Patent
Steinberger

(10) Patent No.: US 12,741,551 B1
(45) Date of Patent: Sep. 22, 2026

(54) ELECTRIC DELIVERY VEHICLE WITH CHARGER

(71) Applicant: Oshkosh Defense, LLC, Oshkosh, WI (US)

(72) Inventor: David Steinberger, Oshkosh, WI (US)

(73) Assignee: Oshkosh Defense, LLC, Oshkosh, WI (US)

(*) Notice: Subject to any disclaimer, the term of this patent is extended or adjusted under 35 U.S.C. 154(b) by 273 days.

(21) Appl. No.: 18/663,529

(22) Filed: May 14, 2024

Related U.S. Application Data

(60) Provisional application No. 63/502,321, filed on May 15, 2023.

(51) Int. Cl.

| | |
|---|---|
| ***B60L 53/14*** | (2019.01) |
| ***B60L 50/64*** | (2019.01) |
| ***H01M 10/46*** | (2006.01) |
| ***H02J 7/00*** | (2006.01) |
| ***H02J 7/70*** | (2026.01) |

(52) U.S. Cl.
CPC ............... *B60L 50/64* (2019.02); *B60L 53/14* (2019.02); *H02J 7/70* (2026.01); *H02J 7/855* (2026.01); *H01M 10/46* (2013.01); *H01M 2220/20* (2013.01)

(58) Field of Classification Search
CPC ... B60L 50/64; B60L 53/14; H02J 7/70; H02J 7/855; H01M 10/46; H01M 2220/20
See application file for complete search history.

(56) References Cited

U.S. PATENT DOCUMENTS

| | | | | |
|---|---|---|---|---|
| 9,499,067 | B2 * | 11/2016 | Dai | B60L 53/00 |
| 11,027,650 | B2 * | 6/2021 | Peng | B60L 58/12 |
| 11,867,043 | B1 * | 1/2024 | Adams | F16K 37/005 |
| 12,304,348 | B2 * | 5/2025 | Ropel | B60L 58/12 |
| 2012/0019196 | A1 * | 1/2012 | Fung | B60L 53/14 320/162 |
| 2017/0008419 | A1 * | 1/2017 | Kim | B60L 1/02 |
| 2020/0231051 | A1 * | 7/2020 | Krogh | B60L 53/14 |
| 2020/0284122 | A1 * | 9/2020 | Golden | G05D 16/2033 |
| 2020/0313249 | A1 * | 10/2020 | Zhao | H01M 10/4257 |
| 2021/0107483 | A1 | 4/2021 | Shively et al. | |
| 2021/0138957 | A1 * | 5/2021 | Peng | B60L 15/2045 |
| 2021/0206372 | A1 | 7/2021 | Shively et al. | |
| 2023/0040276 | A1 | 2/2023 | Shively et al. | |

(Continued)

*Primary Examiner* — Tyler J Lee
(74) *Attorney, Agent, or Firm* — Foley & Lardner LLP

(57) ABSTRACT

An electric delivery vehicle includes a frame, an energy storage system ("ESS"), and an electric motor. The ESS includes a battery assembly including a plurality of batteries, a power distribution unit electrically coupled to the battery assembly, a patch cable, and a charger assembly configured to receive an external connector configured to supply power to the battery assembly. The power distribution unit has a first interface electrically coupled to the battery assembly. The patch cable is configured to engage the first interface of the power distribution unit to electrically couple the patch cable to the battery assembly. The patch cable has a second interface. The charger assembly is configured to separately engage the first interface of the power distribution unit to electrically couple the charger assembly to the battery assembly and the second interface of the patch cable to electrically couple the charger assembly to the patch cable.

20 Claims, 15 Drawing Sheets

(56) References Cited

U.S. PATENT DOCUMENTS

| | | | | |
|---|---|---|---|---|
| 2023/0249665 | A1 | 8/2023 | Shively et al. | |
| 2023/0361590 | A1* | 11/2023 | Lacaux | H02J 7/82 |
| 2023/0415725 | A1 | 12/2023 | Shively et al. | |
| 2024/0140260 | A1* | 5/2024 | Ropel | B60L 58/12 |
| 2024/0140261 | A1* | 5/2024 | Ropel | B60L 58/12 |
| 2025/0018827 | A1* | 1/2025 | Zhao | H01M 10/486 |
| 2025/0033628 | A1 | 1/2025 | Shively et al. | |
| 2025/0100535 | A1 | 3/2025 | Shively et al. | |
| 2025/0100536 | A1 | 3/2025 | Shively et al. | |

* cited by examiner

ELECTRIC DELIVERY VEHICLE WITH CHARGER

CROSS-REFERENCE TO RELATED PATENT APPLICATION

This application claims the benefit of and priority to U.S. Provisional Patent Application No. 63/502,321, filed May 15, 2023, which is incorporated herein by reference in its entirety.

BACKGROUND

Delivery vehicles may have a number of doors, a cab, and a cargo portion. An operator may operate the vehicle from the cab. The cargo portion may serve as a storage area for parcels. The doors may provide entry and exit points for the operator to and from the cab and/or the cargo portion.

SUMMARY

One implementation of the present disclosure relates to an electric delivery vehicle, according to some embodiments. The electric delivery vehicle includes a frame, an energy storage system ("ESS"), and an electric motor. The ESS includes a battery assembly comprising a plurality of batteries, a power distribution unit electrically coupled to the battery assembly, a patch cable, and a charger assembly configured to receive an external connector configured to supply power to the battery assembly. The power distribution unit has a first interface electrically coupled to the battery assembly. The patch cable is configured to engage the first interface of the power distribution unit to electrically couple the patch cable to the battery assembly. The patch cable has a second interface. The charge assembly is configured to separately engage the first interface of the power distribution unit to electrically couple the charger assembly to the battery assembly and the second interface of the patch cable to electrically couple the charger assembly to the patch cable. The electric motor is configured to consume electrical energy provided by the plurality of batteries of the ESS.

In some embodiments, in a first configuration of the ESS, the charger assembly engages the first interface of the power distribution unit such that the charger assembly is electrically coupled to the battery assembly. In a second configuration of the ESS, the charger assembly engages the second interface of the patch cable and the patch cable engages the first interface of the power distribution unit such that the charger assembly is electrically coupled to the battery assembly through the patch cable.

In some embodiments, the electric delivery vehicle defines a forward section and a rearward section. In the first configuration the charger assembly is positioned in the forward section. In the second configuration the charger assembly and the second interface of the patch cable are positioned in the rearward section.

In some embodiments, the battery assembly is positioned in both the forward section and the rearward section. In some embodiments, the portion of the patch cable is coupled to at least one of the frame or the battery assembly.

In some embodiments, the electric delivery vehicle also includes a front axle having a first plurality of tractive elements and a rear axle having a second plurality of tractive elements. The rear axle is positioned rearward of the front axle. The electric motor is configured to drive at least one of the front axle or the rear axle to move the electric delivery vehicle. The forward section is positioned forward of the rear axle and the rearward section is positioned rearward of the rear axle.

In some embodiments, the power distribution unit includes a first port defining the first interface. The patch cable includes a first plug configured to engage the first port and a second port defining the second interface. The first plug is positioned on a first end of the patch cable. The second port is positioned on a second end of the patch cable opposing the first end of the patch cable. The charger assembly includes a second plug configured to engage the first port and the second port and a third port configured to receive the external connector.

In some embodiments, the electric delivery vehicle defines a forward section and a rearward section. The first plug of the patch cable is positioned in the forward section. The second port of the patch cable is positioned in the rearward section.

In some embodiments, in a first configuration of the ESS, the second plug of the charger assembly engages the first port of the power distribution unit. In a second configuration of the ESS the second plug of the charger assembly engages the second port of the patch cable and the first plug of the patch cable engages the first port of the power distribution unit.

In some embodiments, a portion of the patch cable extends in a direction parallel to a direction of travel of the electric delivery vehicle. In some embodiments, the battery assembly is positioned in the forward section.

Another implementation of the present disclosure relates to an energy storage system ("ESS") for an electric delivery vehicle, according to some embodiments. In some embodiments, the ESS includes a battery assembly comprising a plurality of batteries, a power distribution unit electrically coupled to the battery assembly, a patch cable configured to be electrically coupled to the power distribution unit, and a charger assembly configured to be electrically coupled to the power distribution unit. The power distribution unit includes a first port electrically coupled to the battery assembly. The patch cable includes a first plug configured to engage the first port to electrically couple the patch cable to the battery assembly and a second port. The first plug is positioned on a first end of the patch cable. The second port is positioned on a second end of the patch cable. The second port is electrically coupled to the first plug. The charger assembly includes a second plug configured to engage (i) the first port to electrically couple the charger assembly to the power distribution unit and (ii) the second port to electrically couple the charger assembly to the patch cable and a third port configured to receive an external connector configured to supply power to the battery assembly.

In some embodiments, in a first configuration of the ESS, the second plug of the charger assembly engages the first port of the power distribution unit such that the charger assembly is electrically coupled to the battery assembly. In a second configuration of the ESS, the second plug of the charger assembly engages the second port of the patch cable and the first plug of the patch cable engages the first port of the power distribution unit such that the charger assembly is electrically coupled to the battery assembly through the patch cable.

In some embodiments, the ESS defines a forward section positioned forward of a forward surface of the battery assembly and a rearward section positioned rearward of the forward surface of the battery assembly. In the first configuration the charger assembly is positioned in the forward section. In the second configuration the charger assembly is positioned in the rearward section.

Another implementation of the present disclosure relates to a method of charging an electric delivery vehicle, according to some embodiments. The method includes determining, based on a location of the electric delivery vehicle, a position of an external connector relative to the electric delivery vehicle. The external connector is configured to engage a charger of the electric delivery vehicle to supply power to a battery of the electric delivery vehicle. The electric delivery vehicle includes a patch cable configured to selectively electrically couple the charger to the battery. Responsive to determining that the external connector is positioned proximate a forward section of the electric delivery vehicle, the method also includes placing the charger and the patch cable in a first configuration to electrically couple the charger to the battery without electrically coupling the charger to the battery through the patch cable. Responsive to determining that the external connector is positioned proximate a rearward section of the electric delivery vehicle positioned rearward of the forward section of the electric delivery vehicle, the method also includes placing the charger and the patch cable in a second configuration to electrically couple the charger to the battery through the patch cable.

In some embodiments, in the first configuration the charger is positioned in the forward section of the electric delivery vehicle. In the second configuration the charger is positioned in the rearward section of the electric delivery vehicle.

In some embodiments, prior to determining the position of the external connector relative to the electric delivery vehicle, the charger and the patch cable are placed in an intermediate configuration where the charger and the patch cable are not electrically coupled to the battery. In some embodiments, at least a portion of the patch cable extend in a direction parallel to a direction of travel of the electric delivery vehicle. The portion of the patch cable is positioned in both the forward section and the rearward section of the electric delivery vehicle when the patch cable is in the first configuration or the second configuration. In some embodiments, the battery is positioned in both the forward section and the rearward section of the electric delivery vehicle.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
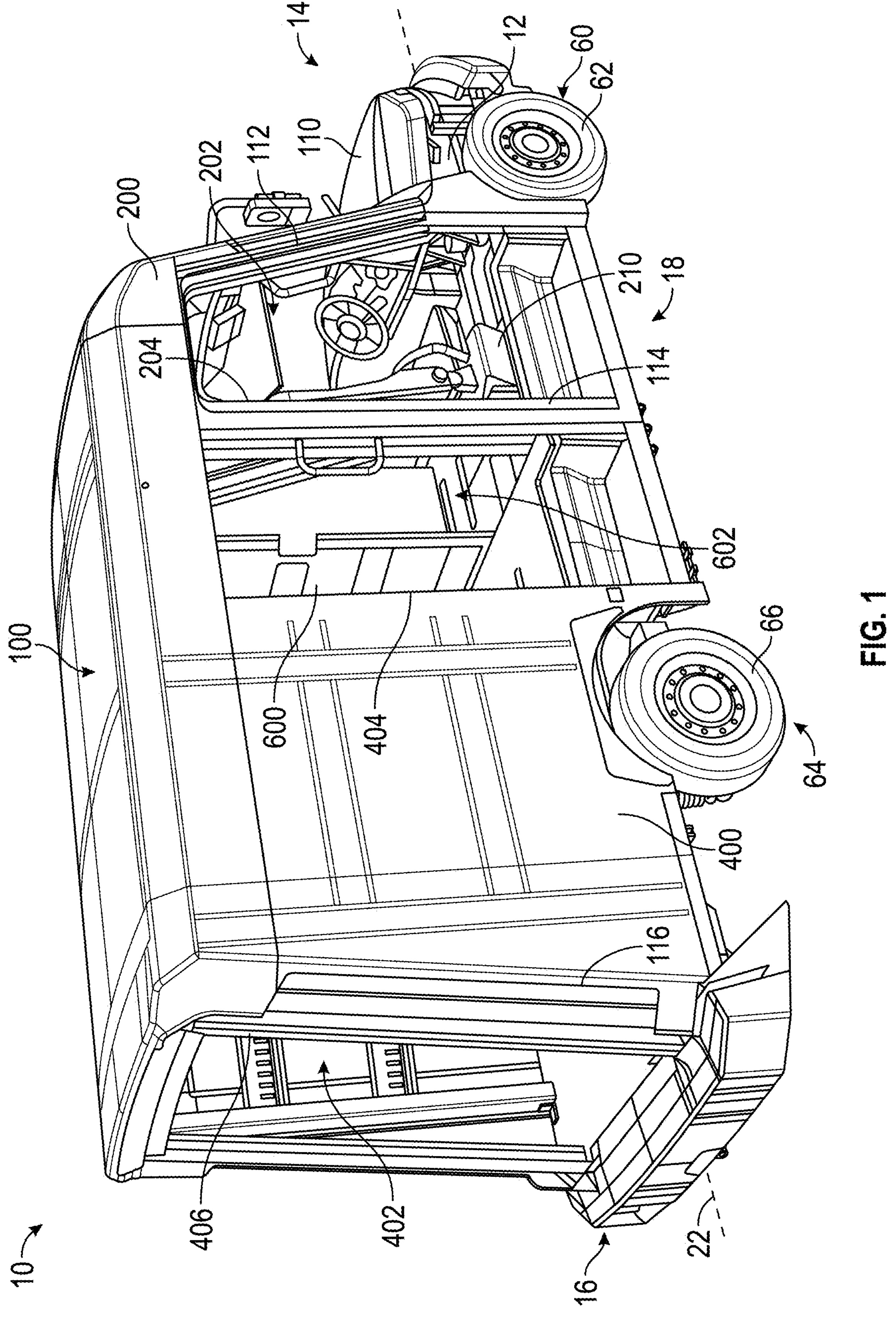
FIG. 1 is a rear perspective view of a delivery vehicle, according to an exemplary embodiment.
Figure 2:
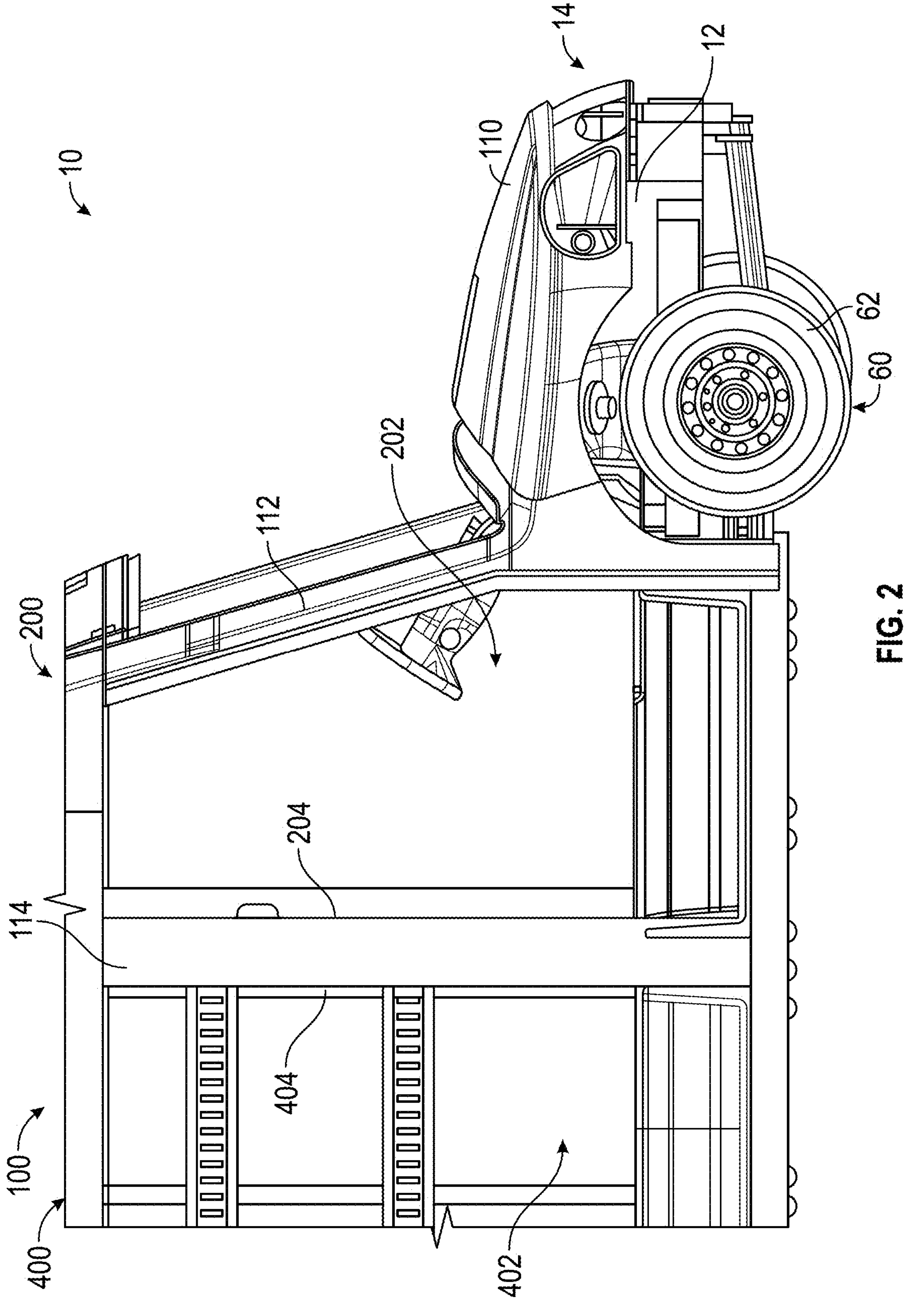
FIG. 2 is a partial side view of the delivery vehicle of FIG. 1, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

In some embodiments, an electrical energy storage system for a delivery vehicle (e.g., a mail truck, a package delivery truck, etc.) includes a battery assembly, a power distribution unit, a patch cable, and a charger assembly. The power distribution unit includes a first port. The patch cable has a first plug configured to interface with the first port of the power distribution unit and a second port. The charger assembly includes a second plug configured to interface with the first port of the power distribution system and the second port of the patch cable and a third port configured to interface with an external connector. In a first configuration, the second plug of the charger assembly is directly coupled to the first port of the power distribution unit, and the charger assembly is positioned in the forward section of the delivery vehicle, and the first plug and the second port of the patch cable are uncoupled. In a second configuration, the second plug of the charger assembly is coupled to the second port of the patch cable, the first plug of the patch cable is directly coupled to the first port of the power distribution unit, and the charger assembly is positioned in the rearward section of the delivery vehicle. Such an electrical energy storage system may advantageously allow an operator to move the charger assembly from the forward section of the delivery vehicle to the rearward section of the delivery vehicle without having to run an additional cable from the forward section to the rearward section since the charger assembly may interface with the patch cable assembly that already extends between the forward section and the rearward section to electrically couple the charger assembly to the power distribution system when the charger assembly is positioned in the rearward section of the delivery vehicle. Additionally, the electrical energy storage system may advantageously allow an operator to move the charger assembly from the forward section to the rearward section of the delivery vehicle without the power distribution unit requiring an additional port as the second plug of the charger assembly may interface with the first port of the power distribution unit when the electrical energy storage system is in the first configuration and the first plug of the patch cable may interface with the first port of the power distribution unit when the electrical energy storage system is in the second configuration.

Overall Vehicle

According to the exemplary embodiment shown in FIGS. 1-7, a vehicle (e.g., a parcel vehicle, a cargo transport vehicle, a mail vehicle, a postal vehicle, a postal van, a truck, a van, etc.), shown as delivery vehicle 10, is configured to facilitate improved parcel delivery. Generally, the delivery vehicle 10 may be a specialized vehicle that transports parcels (e.g., mail, packages, etc.) from a distribution center (e.g., a post office, a warehouse, etc.) to various delivery locations (e.g., recipients' homes, offices, etc.).

As shown in FIGS. 1-7, the delivery vehicle 10 includes a chassis, shown as a frame 12. The frame 12 defines a first end, shown as front end 14, an opposing second end, shown as rear end 16, a first lateral side (e.g., a driver side, etc.), shown as right side 18, and an opposing second lateral side (e.g., a passenger side, etc.), shown as left side 20, of the delivery vehicle 10. While components of the delivery vehicle 10 may be described as being positioned along, proximate, adjacent, etc. the right side 18 or the left side 20 herein, it should be understood that such components could be positioned on the opposite side. As shown in FIG. 1, the frame 12 also defines a longitudinal axis, shown as central axis 22, extending longitudinally through the delivery vehicle 10 from the front end 14 to the rear end 16. As shown in FIG. 1-7, the frame 12 supports a first axle, shown as front axle 60, having a first plurality of tractive elements, shown as front wheels 62, coupled thereto; a second axle, shown as rear axle 64, having a second plurality of tractive elements, shown as rear wheels 66, coupled thereto; a power unit, shown as powertrain 70, that drives the front axle 60 and/or the rear axle 64 to move the delivery vehicle 10; and a body assembly, shown as body 100.

Figure 5:
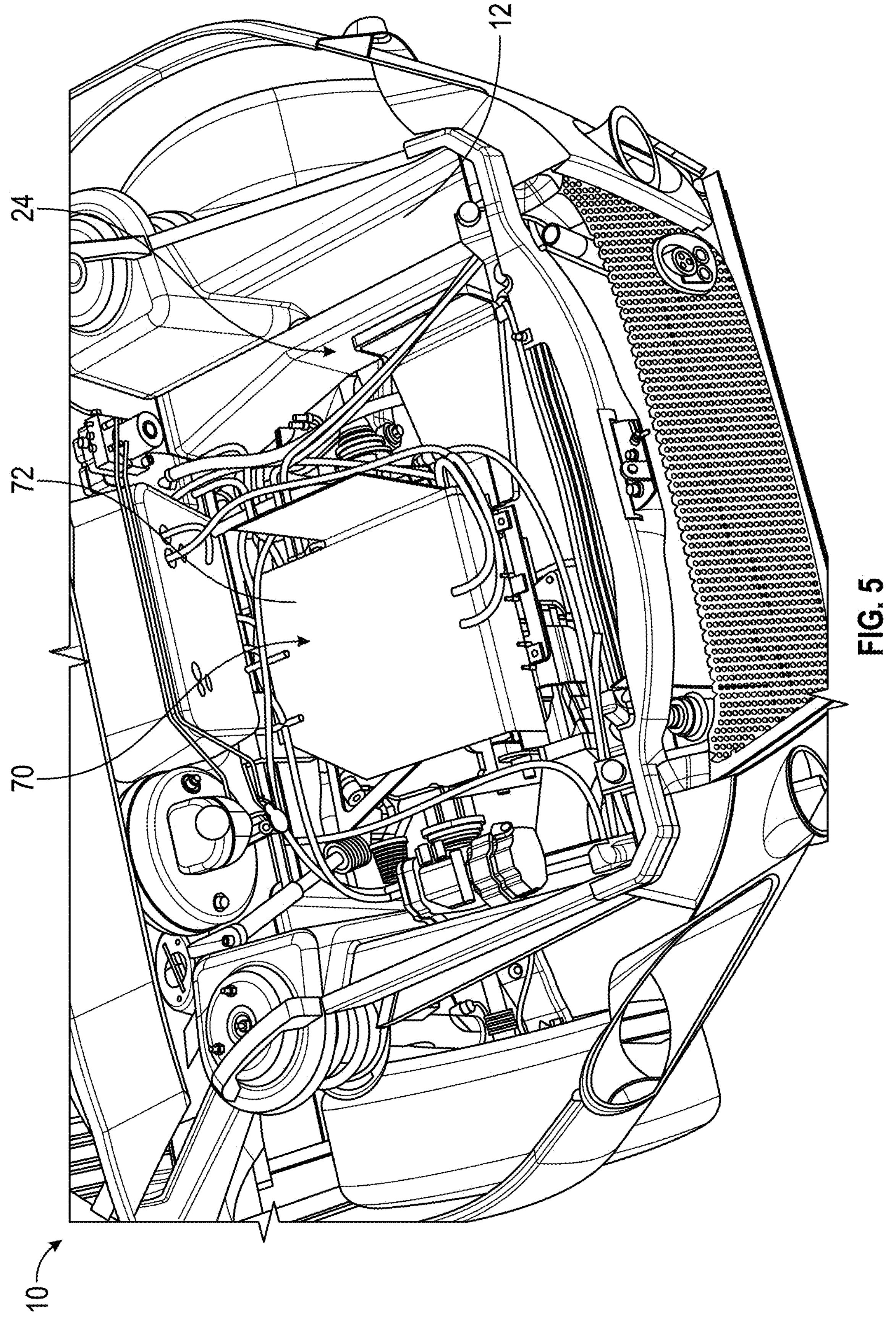
FIG. 5 is a detailed view of a primary driver compartment of the delivery vehicle of FIG. 1, according to an exemplary embodiment.
Figure 6:
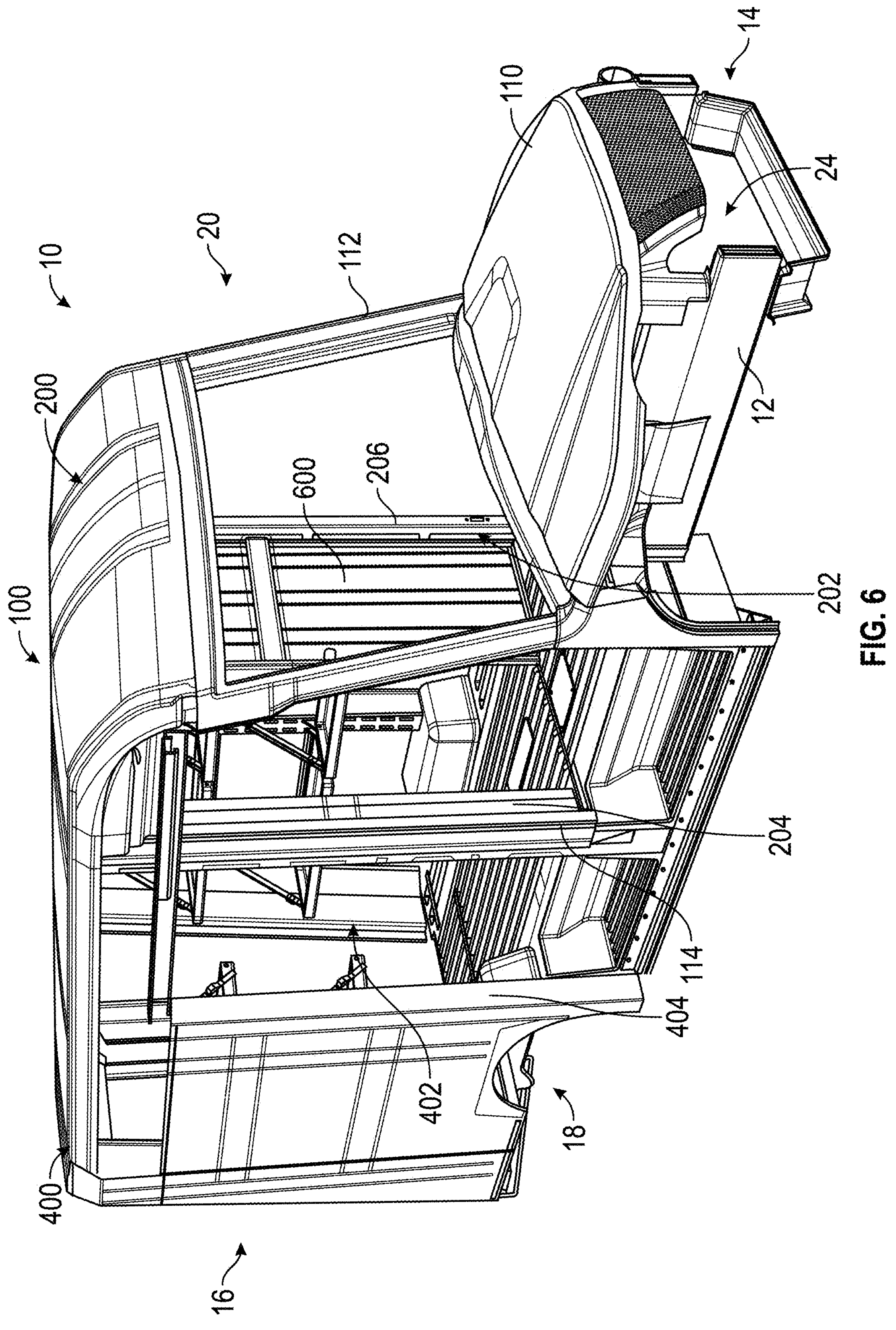
FIG. 6 is a right side perspective view of the delivery vehicle of FIG. 1 without a side door assembly, according to an exemplary embodiment.

As shown in FIG. 5, the powertrain 70 includes a primary driver or prime mover, shown as engine 72, coupled to and disposed within a primary driver compartment, shown as hood compartment 24, at the front end 14 of the frame 12. In some embodiments, the powertrain 70 is a traditional, internal combustion engine driven powertrain. In some embodiments, the powertrain 70 additionally includes on-board energy storage (e.g., a battery pack, etc.), a generator, and/or an electric motor to supplement the engine 72 such that the powertrain 70 is a hybrid powertrain. In some embodiments, the powertrain 70 does not include the engine 72. Rather, the primary driver may be an electric motor and the powertrain 70 may include on-board energy storage such that the powertrain 70 is an electric powertrain. In another embodiment, the primary diver includes a fuel cell and an electric motor such that the powertrain 70 is a fuel cell electric powertrain.

As shown in FIGS. 1-4, 6, and 7, the body 100 includes a hood, shown as hood 110, coupled to the front end 14 of the frame 12 and extending over the hood compartment 24 within which the engine 72 is positioned; a first pair of pillars, shown as A-pillars 112; a second pair of pillars, shown as B-pillars 114; a third pair of pillars, shown as C-pillars 116; a front cabin, shown as cab 200, positioned between the A-pillars 112 and the B-pillars 114; a rear storage section, shown as cargo body 400, positioned behind the cab 200 and between the B-pillars 114 and the C-pillars 116; a divider, shown as partition 600, extending between the B-pillars 114 and at least partially separating the cab 200 from the cargo body 400; and a door assembly, shown as side door assembly 700.

Figure 3:
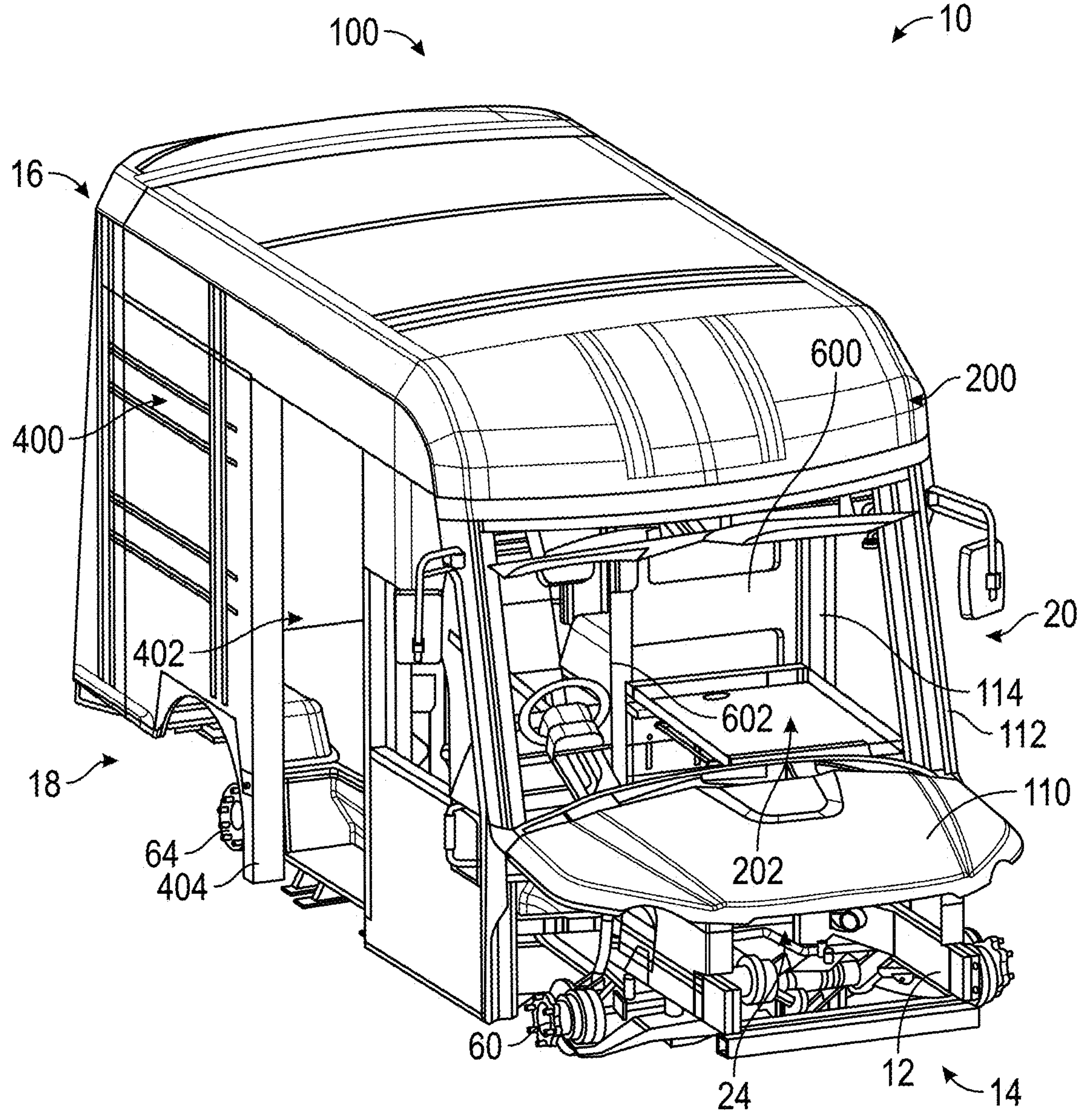
FIG. 3 is a front perspective view of the delivery vehicle of FIG. 1, according to an exemplary embodiment.
Figure 4:
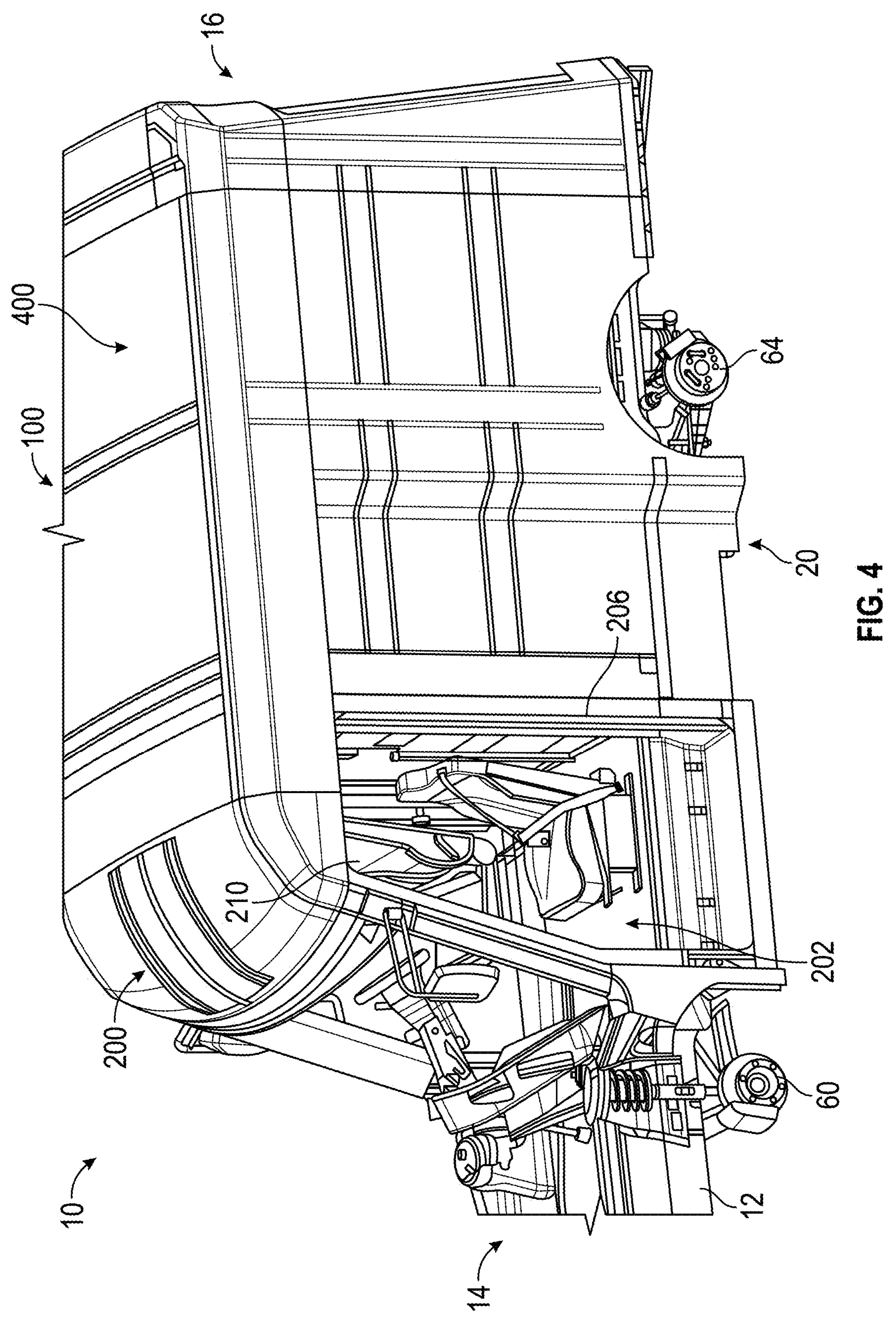
FIG. 4 is a left side perspective view of the delivery vehicle of FIG. 1, according to an exemplary embodiment.

As shown in FIGS. 1-4, 6, and 7, the cab 200 defines a first interior section or zone, shown as driver compartment 202, a first opening, shown as right cab opening 204, and a second opening, shown as left cab opening 206. The right cab opening 204 is positioned along the right side 18 of the delivery vehicle 10. The right cab opening 204 facilitates ingress into and egress from the driver compartment 202. The driver compartment 202 may be configured to contain or otherwise support a number of seats (e.g., one or more seats, etc.), storage units (e.g., a mail tray, etc.), and/or other equipment. As shown in FIGS. 1 and 4, the driver compartment 202 is configured to provide seating for an operator (e.g., a driver, etc.) of the delivery vehicle 10 with a seat, shown as driver seat 210. In some embodiments, the driver compartment 202 is configured to provide seating for a passenger of the delivery vehicle 10 (e.g., a temporary training seat, a repositionable passenger seat, etc.). The driver compartment 202 may also include various controls for driving the delivery vehicle 10 and/or operating the systems thereof (e.g., a user interface, a touchscreen, a display, a steering wheel, an accelerator pedal, a brake pedal, control levers, buttons, switches, etc.).

As shown in FIGS. 1-3 and 6, the cargo body 400 defines a second interior section or zone, shown as cargo compartment 402, a third opening, shown as side cargo opening 404, and a fourth opening, shown as rear cargo opening 406. The side cargo opening 404 is positioned along the right side 18 of the delivery vehicle 10 adjacent the right cab opening 204 with the rightward of the B-pillars 114 separating the two. The side cargo opening 404 facilitates ingress into and egress from the cargo compartment 402 from the right side 18 of the delivery vehicle 10. The rear cargo opening 406 is positioned at the rear end 16 of the delivery vehicle 10. The rear cargo opening 406 facilitates ingress into and egress from the cargo compartment 402 from the rear end 16 of the delivery vehicle 10. According to an exemplary embodiment, the cargo compartment 402 is configured to receive and store parcels (e.g., mail, packages, etc.) for transport and delivery via the delivery vehicle 10. In some embodiments, the cargo compartment 402 includes cabinets, shelves, racks, and/or other storage devices to facilitate organizing and securing the parcels within the cargo compartment 402.

As shown in FIGS. 1 and 3, the partition 600 is a partial partition that defines an opening, shown as passageway 602, that connects the driver compartment 202 to the cargo compartment 402. In some embodiments, the partition 600 includes a door or gate that at least partially and selectively encloses the passageway 602. In other embodiments, the partition 600 is a full partition that completely segregates the driver compartment 202 from the cargo compartment 402.

Figure 7:
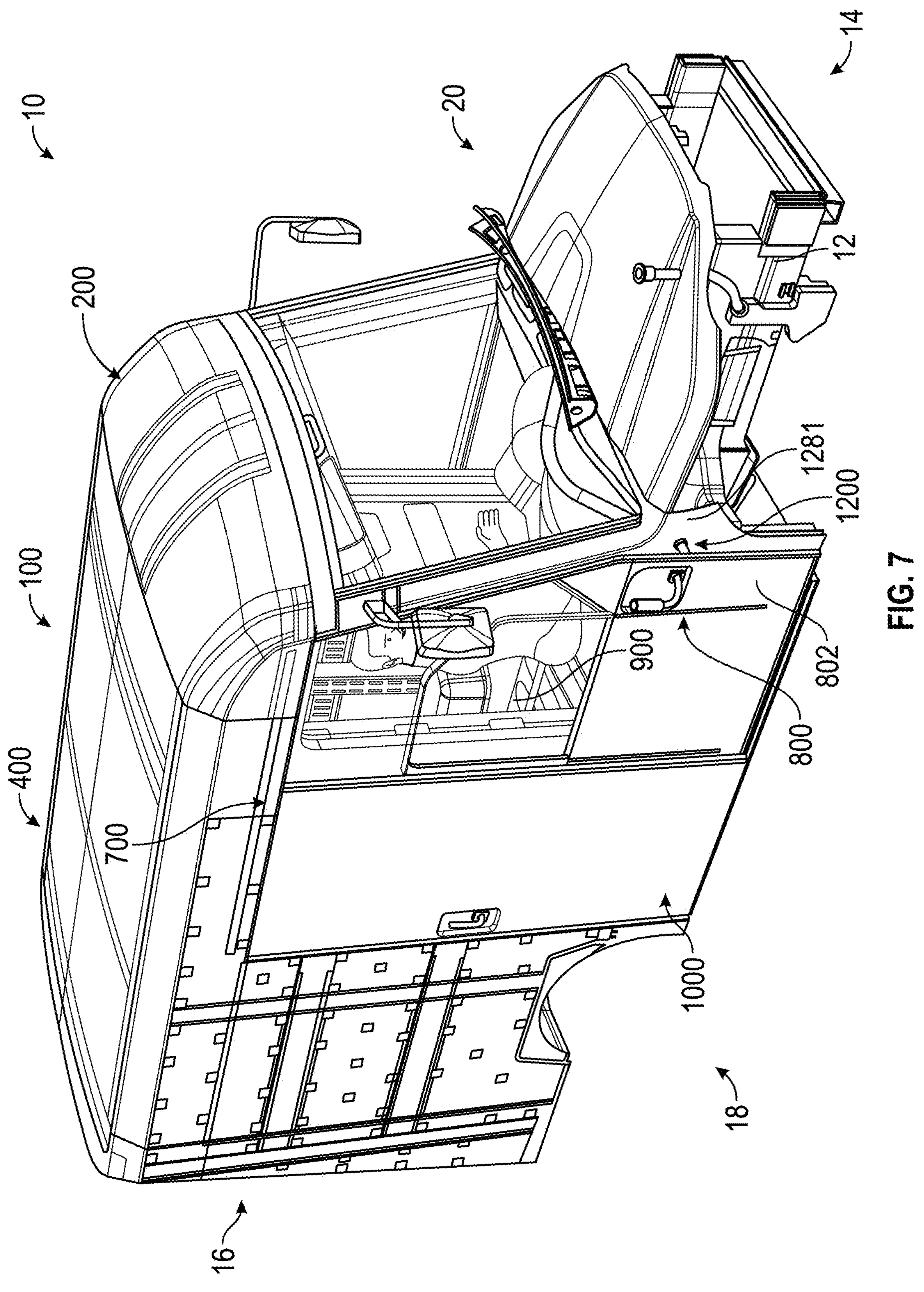
FIG. 7 is a right side perspective view of the delivery vehicle of FIG. 6 having the side door assembly, according to an exemplary embodiment.

As shown in FIG. 7, the side door assembly 700 includes a first door, shown driver cab door 800, a second door, shown as side cargo door 1000, and a locking assembly, shown as door locking assembly 1200. The driver cab door 800 extends over the right cab opening 204 and is selectively openable to access the driver compartment 202. According to an exemplary embodiment, the driver cab door 800 translates or slides rearward along the right side 18 of the body 100 from a closed position to an open position (e.g., such that the driver cab door 800 at least partially overlaps with the side cargo door 1000, extends past the B-pillar 114, etc.). In other embodiments, the driver cab door 800 is hingedly coupled to the body 100 (e.g., the A-pillar 112, etc.) and pivots between a closed position and an open position. As shown in FIG. 7, the driver cab door 800 includes a panel, shown as door panel 802, and a window assembly, shown as window assembly 900, disposed within the door panel 802. According to an exemplary embodiment, the delivery vehicle 10 includes a second cab door or passenger cab door positioned on the left side 20 of the cab 200 that extends over the left cab opening 206 and is selectively openable to access the driver compartment 202. The passenger cab door can similarly slide or pivot between an open position and a closed positioned to facilitate ingress into and egress from the cab 200 from the left side 20 of the delivery vehicle 10. According to an exemplary embodiment, the passenger cab door similarly includes a window disposed therein.

As shown in FIG. 7, the side cargo door 1000 extends over the side cargo opening 404 and is selectively openable to access the cargo compartment 402. According to an exemplary embodiment, the side cargo door 1000 translates or slides forward along the right side 18 of the body 100 from a closed position to an open position (e.g., such that the side cargo door 1000 at least partially overlaps with the driver cab door 800, toward the A-pillar 112, etc.). In another embodiment, the side cargo door 1000 translates or slides rearward along the right side 18 of the body 100 from a closed position to an open position (e.g., away from the right cab opening 204, toward the C-pillar 116, etc.). In other embodiments, the side cargo door 1000 is hingedly coupled to the body 100 (e.g., the B-pillar 114, etc.) and pivots between a closed position and an open position. According to an exemplary embodiment, the delivery vehicle 10 includes a rear door assembly that includes a rear cargo door. The rear cargo door extends over the rear cargo opening 406 and is selectively openable to access the cargo compartment 402.

Electric Delivery Vehicle

Overview

Figure 8:
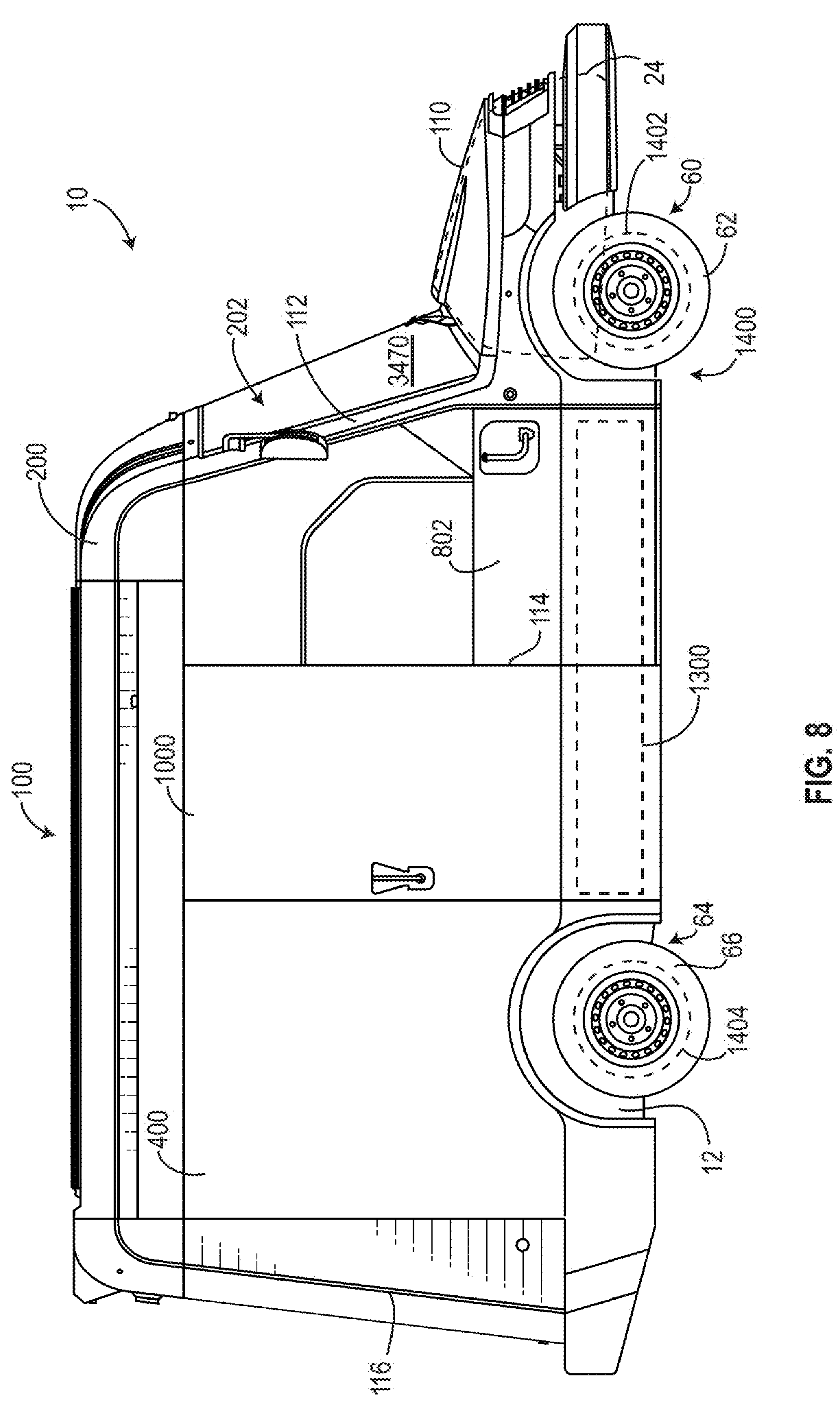
FIG. 8 is a side view of the delivery vehicle of FIG. 1 provided as an electric vehicle, according to an exemplary embodiment.

Referring to FIG. 8, the delivery vehicle 10 may be configured as a fully electric vehicle that uses electrical energy in order to transport (e.g., to drive the front wheels 62 and the rear wheels 66), according to an exemplary embodiment. The delivery vehicle 10 may include an electrical drivetrain 1400 (e.g., an electrically powered chassis, an electrically powered drive system, etc.) that includes a front electrified-axle ("E-axle") 1402 (e.g., a front electrical motor, an electrical transducer that consumes electrical energy and generates mechanical energy) and a rear E-axle 1404. The electrical drivetrain 1400 also includes an electrical energy storage system ("ESS") 1300 that includes multiple battery cells, electrical storage devices, battery packs, batteries, etc. The ESS 1300 may be positioned beneath a floor of the delivery vehicle 10 and coupled with the frame 12 of the delivery vehicle 10. The ESS 1300 is configured to store electrical energy and provide electrical energy to the front E-axle 1402 and the rear E-axle 1404 (e.g., via high-voltage cables or power distribution system including an inverter) such that the front E-axle 1402 and the rear E-axle 1404 drive the front wheels 62 and the rear wheels 66, respectively, to transport the delivery vehicle 10. The front E-axle 1402 and the rear E-axle 1404 may be coupled with the frame 12 and provide support for the delivery vehicle 10. In some embodiments, the front E-axle 1402 is positioned at least partially within the hood compartment 24. Since the delivery vehicle 10 is powered using electric motors (e.g., the front E-axle 1402 and the rear E-axle 1404), the hood compartment 24 is not occupied by the engine 72 and provides space for one or more electrical components of the electrical drivetrain 1400 such as power distribution devices (e.g., inverters, wire routing, a thermal management system, a charging system, etc.), and/or the front E-axle 1402.

Charger Wiring

Figure 9:
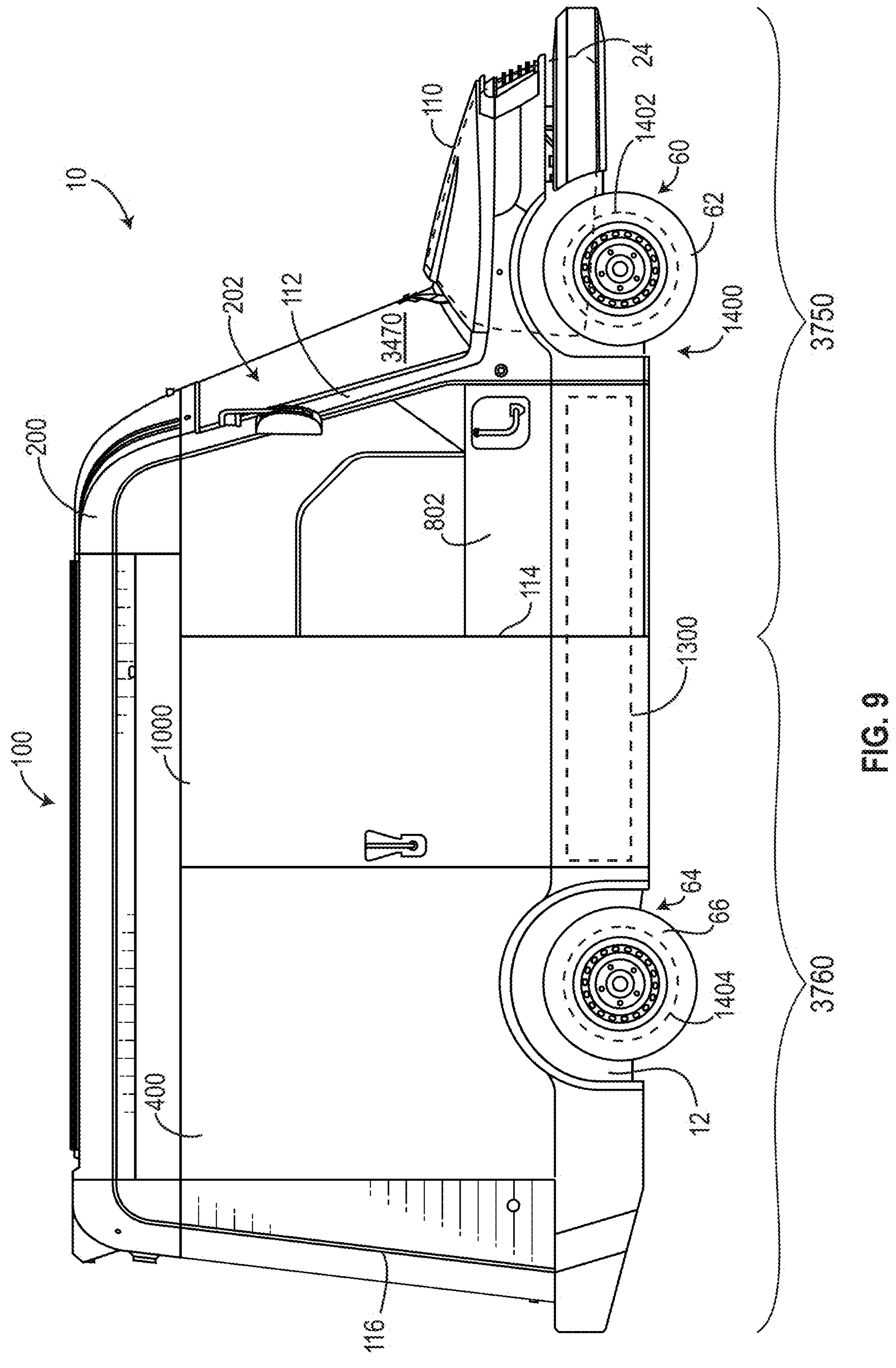
FIG. 9 is a side view of the electric vehicle of FIG. 8 showing a forward section and a rearward section, according to an exemplary embodiment.
Figure 13:
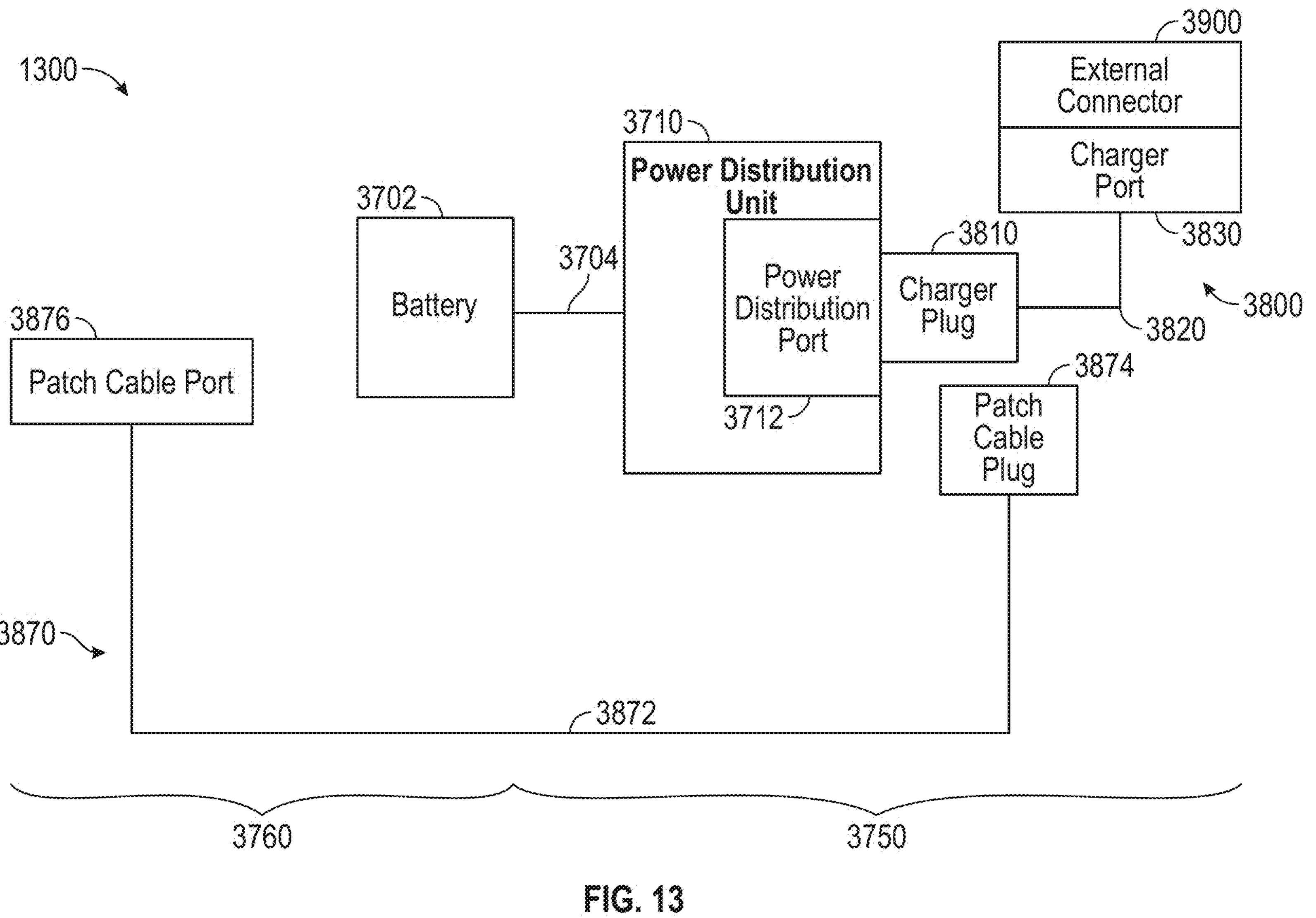
FIG. 13 is a block diagram of a first configuration of the electrical energy storage system of FIG. 11, according to an exemplary embodiment.
Figure 14:
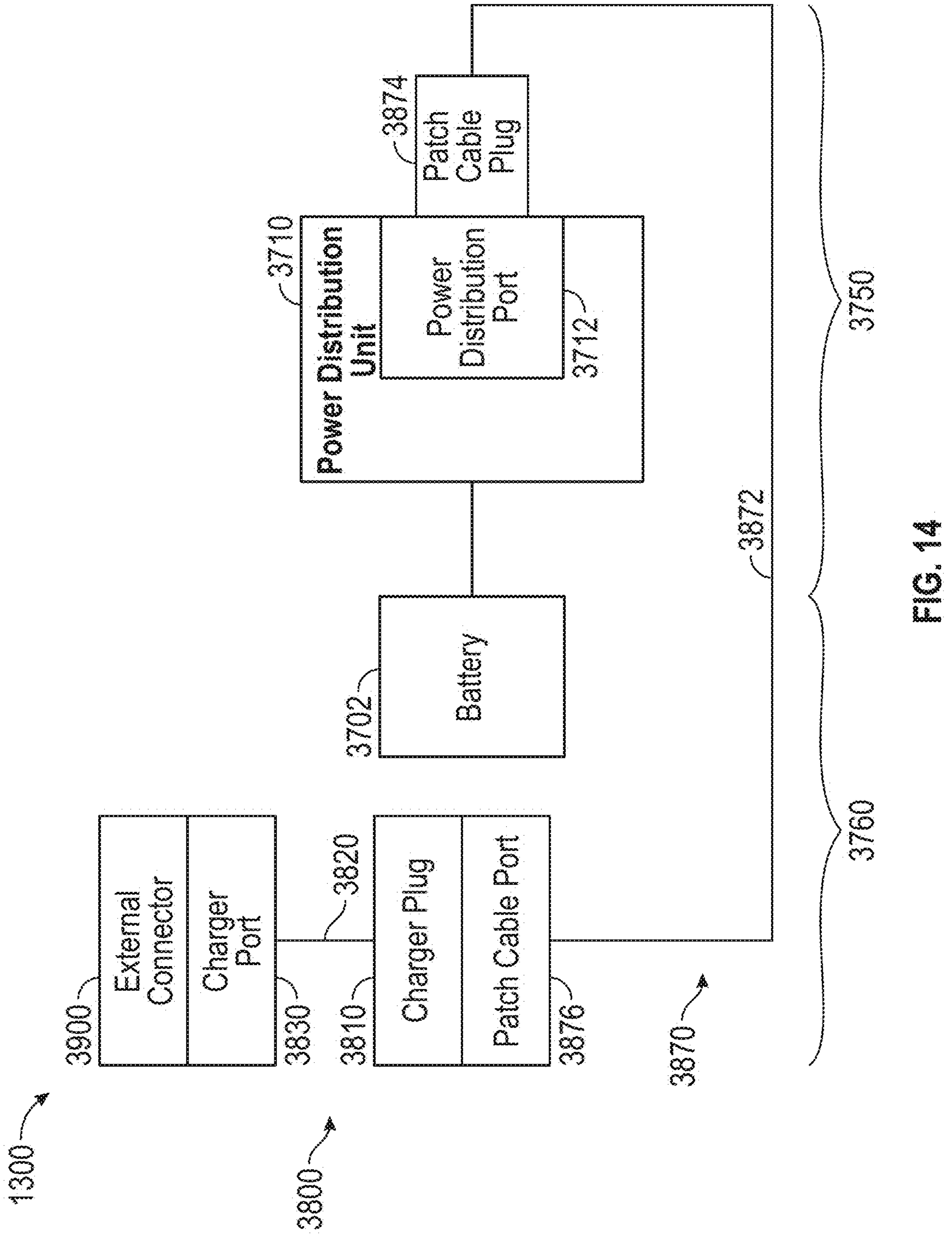
FIG. 14 is a block diagram of a second configuration of the electrical energy storage system of FIG. 11, according to an exemplary embodiment.

As shown in FIGS. 9 and 13-14, the delivery vehicle 10 has a forward section (e.g., a front section, a cab section, a forward portion etc.), shown as forward section 3750, defined as forward (e.g., in a direction of travel of the delivery vehicle 10, etc.) of the B-pillar 114 and a rearward section (e.g., a rear section, a storage section, a rearward section, etc.), shown as rearward section 3760, defined as rearward (e.g., opposite of the direction of travel of the delivery vehicle 10, etc.) of the B-pillar 114, according to some embodiments. For example, a first portion of the components of the delivery vehicle 10 positioned forward of the B-pillar 114 may be positioned in the forward section 3750 of the delivery vehicle 10 and a second portion of the components of the delivery vehicle 10 positioned rearward of the B-pillar 114 may be positioned in the rearward section 3760 of the delivery vehicle 10. In some embodiments, some components of the delivery vehicle 10 may be positioned in both the forward section 3750 and the rearward section 3760. For example, a forward portion (e.g., a first portion, a front portion, etc.) of the ESS 1300 may be positioned in the forward section 3750 of the delivery vehicle 10 and a rearward portion (e.g., a second portion, a rear portion, etc.) of the ESS 1300 may be positioned in the rearward section 3760 of the delivery vehicle 10.

In other embodiments, the forward section 3750 and the rearward section 3760 may be defined by different features of the delivery vehicle 10. For example, the forward section 3750 may be defined as forward of the A-pillar 112 and the rearward section 3760 may be defined as rearward of the A-pillar 112. As another example, the forward section 3750 may be defined as forward of the rear axle 64 and the rearward section 3760 may be defined as rearward of the rear axle 64. As yet another example, the forward section 3750 may be defined as forward of the partition 600 and the rearward section 3760 may be defined as rearward of the partition 600. In still other embodiments, the forward section 3750 and the rearward section 3760 may be defined by different features of elements of the ESS 1300.

Figure 10:
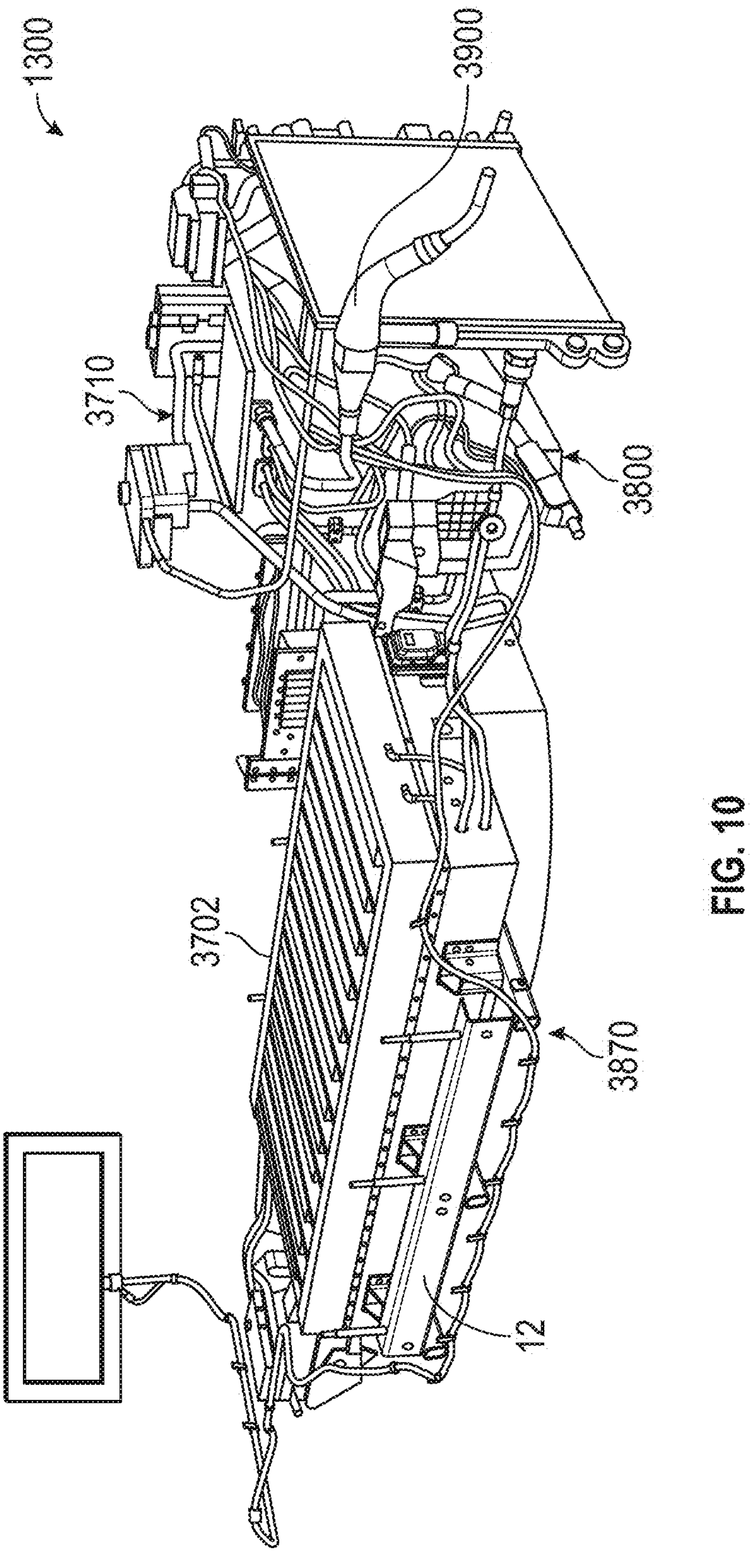
FIG. 10 is a right side perspective view of an electrical energy storage system of the delivery vehicle of FIG. 1, according to an exemplary embodiment.

As shown in FIGS. 10 and 13-14, the ESS 1300 includes a battery assembly (e.g., battery cells, battery pack, etc.), shown as battery 3702, positioned between the front e-axle 1402 and the rear e-axle 1404, according to some embodiments. The battery 3702 is configured to store electrical energy and provide the electrical energy to the front E-axle 1402 and the rear E-axle 1404 to operate the delivery vehicle 10. For example, the battery 3702 may be electrically coupled to the front E-axle 1402 and the rear E-axle 1404 through wiring to provide the electrical energy to the front E-axle 1402 and the rear E-axle 1404. In various embodiments, the battery 3702 is electrically coupled to other electrical components of the delivery vehicle 10 (e.g., the window assembly 900, the electrical drivetrain 1400, etc.) and is configured to provide the electrical energy to the other electrical component of the delivery vehicle 10. For example, the battery 3702 may be electrically coupled to an electric motor configured to raise and lower a window of the window assembly 900 and the battery 3702 may provide the electrical energy to the electric motor to raise and lower the window of the window assembly 900. In some embodiments, the battery 3702 may include a plurality of batteries (e.g., a plurality of battery cells, etc.).

As shown in FIG. 9, the battery 3702 may be positioned in both the forward section 3750 and the rearward section 3760. For example, the battery 3702 may extend from the forward section 3750 into the rearward section 3760 when the B-pillar 114 defines the forward section 3750 and the rearward section 3760. In some embodiments, the battery 3702 may be positioned in the forward section 3750. For example, when the forward section 3750 is defined as forward of the rear axle 64, the battery 3702 may be positioned in the forward section 3750. In other embodiments, the battery 3702 may define the forward section 3750 and the rearward section 3760. For example, a forward surface of the battery 3702 (e.g., forward in the direction of travel of the delivery vehicle 10, etc.) may define the forward section 3750 and the rearward section 3760. The forward section 3750 may be positioned forward of the forward surface of the battery 3702 and the rearward section 3760 may be positioned rearward of the battery 3702. In various embodiments, the forward section 3750 and the rearward section 3760 may be a forward section of the ESS 1300 and a rearward section of the ESS 1300 respectively.

As shown in FIG. 10, the battery 3702 is coupled to the frame 12, according to some embodiments. For example, the battery 3702 may be positioned between the right side 18 of the frame 12 and the left side 20 of the frame 12 and coupled to the right side 18 of the frame 12 and the left side 20 of the frame 12. As another example, the battery 3702 may be positioned between the front end 14 of the frame 12 and the rear end 16 of the frame 12 and coupled to the front end 14 of the frame 12 and the rear end 16 of the frame 12. In some embodiments, battery 3702 is additionally or alternatively coupled to the body 100. For example, the battery 3702 may be coupled to the frame 12 and the body 100.

In some embodiments, the battery 3702 is configured to receive electrical energy from another source (e.g., a regenerative braking system, an external source, etc.) in order to charge the battery 3702 (e.g., increase the electrical energy stored in the battery 3702. For example, the battery 3702 may be configured to receive the electrical energy from a charging station and store the electrical energy in the battery 3702 until the electrical energy is required to operate the delivery vehicle 10.

As shown in FIGS. 10, 11, 13, and 14, the ESS 1300 includes a power distribution unit (e.g., a power controller, a power splitter, distribution panel, etc.), shown as power distribution unit 3710, electrically coupled to the battery 3702 and configured to receive the electrical energy from the battery 3702, according to some embodiments. In some embodiments, the power distribution unit 3710 is positioned within the hood compartment 24. For example, the power distribution unit 3710 may be coupled to a portion of the frame 12 proximate and/or extending into the hood compartment 24 such that the power distribution unit 3710 is positioned within the hood compartment 24. In other embodiments, the power distribution unit 3710 is positioned within other section of the delivery vehicle 10 (e.g., the driver compartment 202, the cargo compartment 402, positioned between portions of the frame 12, coupled to the battery 3702, etc.).

In some embodiments, the power distribution unit 3710 is configured to provide electrical energy to the battery 3702 (e.g., when the battery 3702 is configured as a rechargeable battery, etc.). For example, the power distribution unit 3710 may be configured to receive electrical energy from an electrical energy source (e.g., a regenerative braking system, an external electrical energy source, etc.) and provide the electrical energy to the battery 3702 to charge the battery 3702. In other embodiments, a first of the power distribution units 3710 is configured to receive the electrical energy from the battery 3702 and provide the electrical energy received from the battery 3702 to components of the ESS 1300 to operate the delivery vehicle 10 and a second of the power distribution units 3710 is configured to receive electrical energy from an external source (e.g., a charger station, etc.) and provide the electrical energy to the battery 3702 to charge the battery 3702.

As shown in FIGS. 13 and 14, the power distribution unit 3710 is electrically coupled to the battery 3702 by a battery cable (e.g., a first wire, a first cable, etc.), shown as battery cable 3704, according to some embodiments. For example, the battery cable 3704 may extend between the power distribution unit 3710 and the battery 3702 to electrically couple the power distribution unit 3710 and the battery 3702. In some embodiments, the battery cable 3704 may include a plurality of wires (e.g., a first plurality of wires, etc.) configured to provide electrical energy from the battery 3702 to the power distribution unit 3710 and receive electrical energy from the power distribution unit 3710. For example, the battery cable 3704 may include a first wire configured to provide the electrical energy from the battery 3702 to the power distribution unit 3710 and a second wire configured to provide the electrical energy from the power distribution unit 3710 to the battery 3702. In other embodiments, the power distribution unit 3710 is directly electrically coupled to the battery 3702.

In some embodiments, the power distribution unit 3710 is configured to generate control signals corresponding to the battery 3702. For example, the power distribution unit 3710 may be configured to receive data corresponding to a charge level (e.g., a fill level, etc.) of the battery 3702 (e.g., from a battery sensor, etc.) and may generate control signals to charging components of the ESS 1300 based on the data. For example, when the power distribution unit 3710 receives data indicating that the battery 3702 is 75% charged, the power distribution unit 3710 may generate a control signal based on the data that corresponds to slowing down a rate of charging of the battery 3702. As another example, when the power distribution unit 3710 receives data indicating that the battery 3702 is 100% charged, the power distribution unit 3710 may generate a control signal based on the data that corresponds to stopping the charging of the battery 3702 to prevent overcharging of the battery 3702.

Figure 11:
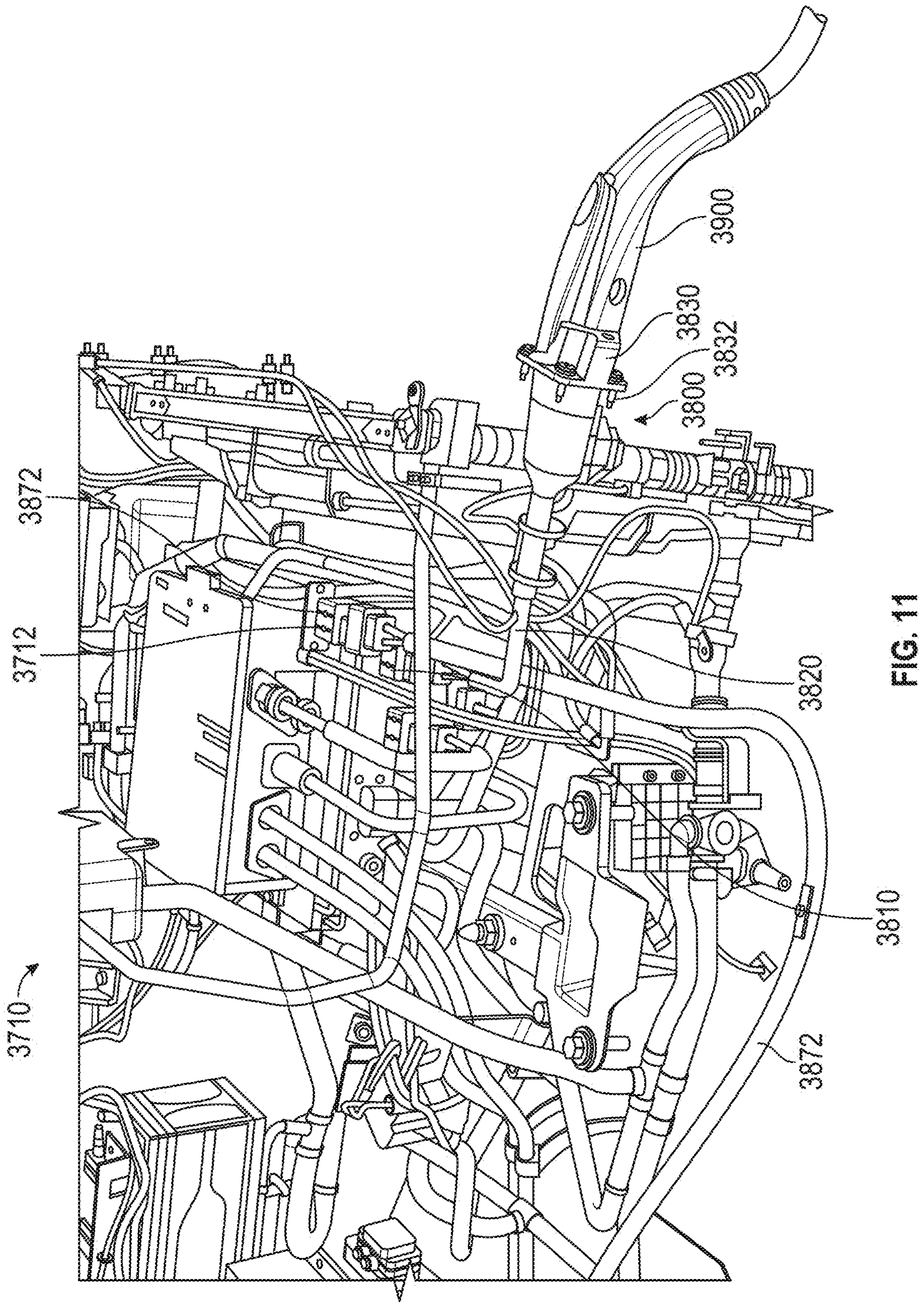
FIG. 11 is a partial right side perspective view of the electrical energy storage system of the delivery vehicle of FIG. 1 in a front charging configuration, according to an exemplary embodiment.

As shown in FIGS. 11, 13, and 14, the power distribution unit 3710 includes a first port (e.g., a first socket, a first outlet, a first interface etc.), shown as power distribution port 3712, configured to receive a plug (e.g., jack, etc.) and to electrically couple the plug to the power distribution unit 3710, according to some embodiments. For example, the power distribution port 3712 may define a plurality of apertures arranged in a particular pattern that are configured to receive a plurality of prongs of a port arranged in a corresponding pattern that corresponds to the particular pattern of the plurality of apertures. In some embodiments, the power distribution port 3712 is electrically coupled to the battery 3702. For example, the power distribution port 3712 may be electrically coupled to the battery 3702 through the power distribution unit 3710 (e.g., through internal wiring of the power distribution unit 3710, etc.) and/or the battery cable 3704. In other embodiments, the power distribution unit 3710 includes a first plug configured to receive a port and electrically couple the port to the power distribution unit 3710.

In some embodiments, the power distribution port 3712 may include an engagement mechanism (e.g., a latch, an engagement device, etc.) configured to engage the plug when the plug is received by the power distribution port 3712. For example, the power distribution port 3712 may include a latch configured to engage a ledge of the plug to prevent the plug from disengaging from the power distribution port 3712 when the plug is received by the power distribution port 3712. In other embodiments, the power distribution port 3712 engages the plug using different means (e.g., friction fit, press fit, etc.).

As shown in FIGS. 10, 11, 13, and 14, the ESS 1300 includes a charger (e.g., a charging device, etc.), shown as charger assembly 3800, configured to receive electrical energy from an external source (e.g., external to the delivery vehicle 10, etc.), according to some embodiments. For example, the charger assembly 3800 may be configured to receive electrical energy from an external charging station. In some embodiments, the charger assembly 3800 is configured to provide the electrical energy received from the external source to the power distribution unit 3710 and/or the battery 3702. For example, when charging the battery 3702, the charger assembly 3800 may receive electrical energy from the external source and provide the electrical energy to the battery 3702 through the power distribution unit 3710. In some embodiments, the charger assembly 3800 is configured to control a rate of the electrical energy being received from the external source. For example, the charger assembly 3800 may receive a control signal from the power distribution unit 3710 corresponding to reducing the rate of the electrical energy being provided to the battery 3702 and the charger assembly 3800 may throttle the rate of electrical energy received from the external source to reduce the rate of the electrical energy being provided to the battery 3702. In some embodiments, the ESS 1300 includes a plurality of the charger assemblies 3800. For example, the ESS 1300 may include a first of the charger assemblies 3800 in the forward section 3750 of the delivery vehicle 10 and a second of the charger assemblies 3800 in the rearward section 3760 of the delivery vehicle 10.

As shown in FIGS. 11-14, the charger assembly 3800 includes a first plug (e.g., a first jack, etc.) shown as charger plug 3810, configured to be selectively received by the power distribution port 3712 to selectively electrically couple the charger assembly 3800 to the power distribution unit 3710, according to some embodiments. For example, the charger plug 3810 may include a plurality of prongs (e.g., extensions, posts, extrusions, etc.) arranged in a particular pattern that are configured engage a plurality of apertures of the power distribution port 3712. The charger plug 3810 may be selectively electrically coupled to the battery 3702 when the charger plug 3810 is engaged with the power distribution port 3712. For example, the charger plug 3810 may be electrically coupled to the battery 3702 through the power distribution port 3712, the power distribution unit 3710, and/or the battery cable 3704. In other embodiments, the charger assembly 3800 includes a port configured to selectively receive a plug of the power distribution unit 3710.

In some embodiments, the charger plug 3810 may be configured to be engaged by the power distribution port 3712 when the charger plug 3810 is electrically coupling the charger assembly 3800 to the power distribution unit 3710. For example, the charger plug 3810 may be configured to be engaged by the engagement mechanism of the power distribution port 3712 when the charger plug 3810 is electrically coupled to the power distribution port 3712. As another example, the charger plug 3810 may be configured to be engaged to the power distribution port 3712 by friction when the charger plug 3810 is electrically coupled to the power distribution port 3712.

As shown in FIGS. 11-14, the charger assembly 3800 includes a charger cable (e.g., a second wire, a second cable, etc.), shown as charger cable 3820, electrically coupled to the charger plug 3810, according to some embodiments. The charger cable 3820 may extend away from the charger plug 3810. In some embodiments, the charger cable 3820 includes a plurality of wires (e.g., a second plurality of wires, etc.) electrically coupled to the charger plug 3810. For example, the charger cable 3820 may include a first wire configured to provide electricity to the charger plug 3810 and a second wire configured to receive control signals from the charger plug 3810 (e.g., from the power distribution unit 3710, etc.).

As shown in FIGS. 11-14, the charger assembly 3800 includes a second port (e.g., a second socket, a second outlet, a second interface, etc.), shown as charger port 3830, electrically coupled to the charger cable 3820 and configured to receive a connector (e.g., a plug, a jack, etc.), shown as external connector 3900. For example, the charger port 3830 may include a plurality of apertures arranged in a particular pattern that are configured to receive a plurality of prongs of the external connector 3900 arranged in a corresponding pattern that corresponds to the particular pattern of the plurality apertures. The external connector 3900 may be configured to supply power (e.g., electrical power, etc.) to the battery 3702. For example, the external connector 3900 may be electrically coupled to an external source of electricity so that the battery 3702 is charged when the external connector 3900 is coupled to the charger port 3830.

As shown in FIG. 10, the charger port 3830 includes a plurality of fasteners, shown as charger port fasteners 3832, configured to releasably couple the charger port 3830 to the body 100 of the delivery vehicle 10, according to some embodiments. In some embodiments, the external connector 3900 includes a locking pin and the charger port 3830 includes an interface configured to receive the locking pin. The locking pin may be actuated electromagnetically to lock the external connector 3900 to the charger port 3830 when the battery 3702 is being charged by the external source of electricity. In some embodiments, the charger port 3830 may be configured to electromagnetically unlock the locking pin from the charger port 3830 based on a control signal received form the power distribution unit 3710. For example, when the battery 3702 is 100% charged, the power distribution unit 3710 may generate a control signal for the charger port 3830 to unlock the locking pin from the charger port 3830 to stop the flow of electrical energy from the external connector 3900 into the charger port 3830 to stop the charging of the battery 3702.

As shown in FIGS. 11-14, the ESS 1300 includes a jumper cable, shown as patch cable assembly 3870 (e.g., a patch cable, etc.), extending along a length of the delivery vehicle 10, according to some embodiments. In some embodiments, the patch cable assembly 3870 extends through the forward section 3750 and the rearward section 3760. For example, a first portion of the patch cable assembly 3870 may be positioned within the forward section 3750 and a second portion of the patch cable assembly 3870 may be positioned within the rearward section 3760. The patch cable assembly 3870 may be configured to transfer electrical energy from the rearward section 3760 to the forward section 3750 or from the forward section 3750 to the rearward section 3760.

As shown in FIGS. 11-14, the patch cable assembly includes a third cable (e.g., a third cable, a third wire, etc.), shown as patch cable 3872, extending along a length of the delivery vehicle 10, according to some embodiments. For example, a portion of the patch cable 3872 may extend in a direction parallel to the direction of travel of the delivery vehicle 10. In some embodiments, the patch cable 3872 may include a plurality of wires (e.g., a third plurality of wires, etc.). In some embodiments, a portion of the patch cable 3872 may be coupled (e.g., secured, etc.) to a portion of the battery 3702. For example, a portion of the patch cable 3872 extending between the forward section 3750 into the rearward section 3760 may be coupled to an outside surface of the battery. In various embodiments, the patch cable 3872 is coupled to the frame 12 and/or the body 100.

As shown in FIGS. 11 and 13-14, the patch cable assembly 3870 includes a second plug (e.g., a second jack, etc.), shown as patch cable plug 3874, configured to be selectively received by the power distribution port 3712 to selectively electrically couple the patch cable assembly 3870 to the power distribution unit 3710, according to some embodiments. For example, the patch cable plug 3874 may include a plurality of prongs (e.g., extensions, posts, extrusions, etc.) arranged in a particular pattern that are configured engage the plurality of apertures of the power distribution port 3712 to electrically couple the patch cable plug 3874 to the power distribution port 3712. The patch cable plug 3874 may be selectively electrically coupled to the battery 3702 when the patch cable plug 3874 is engaged with the power distribution port 3712. For example, the patch cable plug 3874 may be electrically coupled to the battery 3702 through the power distribution port 3712, the power distribution unit 3710, and/or the battery cable 3704. In other embodiments, the patch cable assembly 3870 includes a port configured to selectively receive a plug of the power distribution unit 3710.

In some embodiments, the patch cable plug 3874 is coupled to a first end of the patch cable 3872 positioned in the forward section 3750 of the delivery vehicle 10. For example, the patch cable plug 3874 may be coupled to the first portion of the patch cable 3872 positioned within the forward section 3750 of the delivery vehicle 10. In some embodiments, the patch cable plug 3874 is positioned within the hood compartment 24. In various embodiments, the patch cable plug 3874 is configured to be coupled to the power distribution unit 3710 and/or the body 100 of the delivery vehicle 10. For example, the power distribution unit 3710 and/or the body 100 may include a patch plug bracket configured to couple to the patch cable plug 3874 to secure the patch cable plug 3874 to the power distribution unit 3710 and/or the body 100 when the patch cable plug 3874 is not electrically coupled to the power distribution port 3712. In other embodiments, the patch cable 3872 is configured to be coupled to the power distribution unit 3710 and/or the body 100 of the delivery vehicle 10 in the forward section 3750 of the delivery vehicle 10. For example, the power distribution unit 3710 and/or the body 100 may include a patch cable bracket positioned in the forward section 3750 configured to couple to the patch cable 3872 to secure the patch cable 3872 to the power distribution unit 3710 and/or the body 100 when the patch cable plug 3874 is not electrically coupled to the power distribution port 3712.

Figure 12:
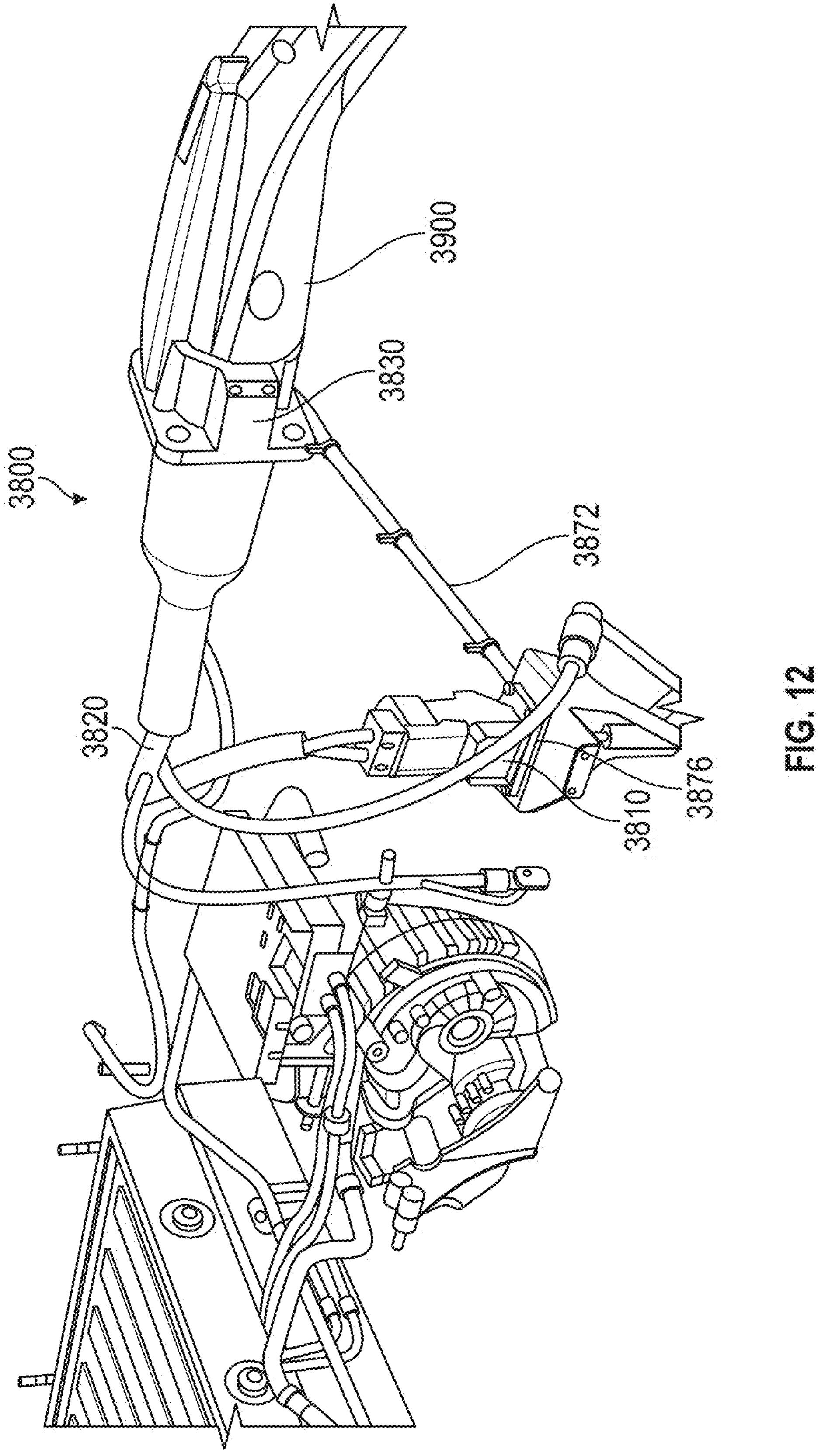
FIG. 12 is a partial rear perspective view of the electrical energy storage system of the delivery vehicle of FIG. 1 in a rear charging configuration, according to an exemplary embodiment.

As shown in FIGS. 12-14, the patch cable assembly 3870 includes a third port (e.g., a third socket, a third outlet, etc.), shown as patch cable port 3876, configured to selectively receive the charger plug 3810 and to selectively electrically couple the charger plug 3810 to the patch cable 3872, according to some embodiments. For example, the patch cable port 3876 may define a plurality of apertures arranged in a particular pattern that are configured to receive the plurality of prongs of the charger plug 3810 arranged in a corresponding pattern that correspond to the particular pattern of the apertures of the patch cable port 3876 such that the prongs of the charger plug 3810 may extend through the apertures of the patch cable port 3876 when the charger plug 3810 is received by the patch cable port 3876. The particular pattern of the apertures of the patch cable port 3876 may correspond to the particular pattern of the apertures of the power distribution port 3712 such that the prongs of the charger plug 3810 may extend through the aperture of the patch cable port 3876 when the charger plug 3810 is received by the patch cable port 3876 and the apertures of the power distribution port 3712 when the charger plug 3810 is received by the power distribution port 3712. In other embodiments, the patch cable port 3876 includes a first plug configured to receive a port and electrically couple the port to the patch cable 3872.

In some embodiments, the patch cable port 3876 is coupled to a second end of the patch cable 3872 opposite the first end of the patch cable 3872 and positioned in the rearward section 3760 of the delivery vehicle 10. For example, the patch cable port 3876 may be coupled to the second portion of the patch cable 3872 positioned within the rearward section 3760 of the delivery vehicle 10. In some embodiments, the patch cable port 3876 is positioned in the cargo compartment 402. In various embodiments, the patch cable port 3876 is coupled to the body 100 of the delivery vehicle 10. For example, the body 100 may include a patch cable port bracket configured to couple to the patch cable port 3876 to secure the patch cable port 3876 to the body 100. The patch cable port bracket may be configured to secure the patch cable port 3876 to the body 100 when the patch cable port 3876 is not electrically coupled to the charger plug 3810. In other embodiments, the patch cable 3872 is configured to be coupled to the body 100 of the delivery vehicle 10 in the rearward section 3760 of the delivery vehicle 10. For example, the body 100 may include a patch cable bracket positioned in the rearward section 3760 configured to couple to the patch cable 3872 to secure the patch cable 3872 to the body 100 when the patch cable port 3876 is not electrically coupled to the charger plug 3810.

The ESS 1300 may be configured in multiple configurations to ease the process of charging of the delivery vehicle 10 with the external connector 3900. As shown in FIGS. 11 and 13, in a first configuration of the ESS 1300 (e.g., a forward charging configuration, a front charging configuration, a hood charging configuration, etc.), the charger plug 3810 of the charger assembly 3800 is coupled (e.g., directly coupled, etc.) to the power distribution port 3712 of the power distribution unit 3710 to electrically couple the charger assembly 3800 to the power distribution unit 3710, according to some embodiments. For example, the charger plug 3810 may be electrically coupled to the battery 3702 without being electrically coupled to the battery 3702 through the patch cable assembly 3870. That is, in the first configuration the charger assembly 3800 may be electrically coupled to the battery 3702 and the patch cable assembly 3870 may not be electrically coupled to the battery 3702. In the first configuration, the charger assembly 3800 may be positioned within the forward section 3750 of the delivery vehicle 10. For example, a portion of the charger assembly 3800 may be positioned within the hood compartment 24. In the first configuration, the patch cable assembly 3870 may be electrically decoupled from the battery 3702, the power distribution unit 3710, and/or the charger assembly 3800. For example, in the first configuration, the patch cable plug 3874 may be decoupled from the power distribution port 3712 and the patch cable port 3876 may be decoupled from the charger plug 3810 since the charger plug 3810 may be directly coupled to the power distribution port 3712. In the first configuration, the external connector 3900 may be electrically coupled to the charger port 3830 proximate the forward section 3750 of the delivery vehicle 10. In various embodiments, in the first configuration, the charger plug 3810 of a first of the charger assemblies 3800 positioned in the forward section 3750 of the delivery vehicle 10 is coupled to the power distribution port 3712 while the charger plug 3810 of a second of the charger assemblies 3800 positioned in the rearward section 3760 of the delivery vehicle 10 is not electrically coupled to the power distribution port 3712.

In some embodiments, in the first configuration, the charger port 3830 is coupled to a portion of the body 100 positioned in the forward section 3750 by the charger port fasteners 3832. For example, the body 100 may define a first charger aperture (e.g., a first charger opening, etc.) configured to receive the charger port 3830 that is positioned in the forward section 3750. In the first configuration, the charger port 3830 may extend through the first charger aperture and be coupled to the body 100 proximate the first charger aperture by the charger port fasteners 3832. For example, the body 100 may define a plurality of first fastener apertures proximate the first charger aperture configured to receive the charger port fasteners 3832 and the charger port fasteners 3832 may extend through the first fastener apertures to couple the charger port 3830 to the body 100. In various embodiments, the first charger aperture may be defined by the right side 18 or the left side 20 of the body 100. In other embodiments, the right side 18 of the body 100 may define a first of the first charger apertures and the left side of the body 100 may define a second of the first charger apertures such that in the first configuration the charger port 3830 may be positioned on the right side 18 or the left side 20. In some embodiments, the first charger aperture may be defined in the hood 110 of the body 100.

As shown in FIGS. 12 and 14, in a second configuration of the ESS 1300 (e.g., a rearward charging configuration, a rear charging configuration, a cargo body charging configuration, etc.), the charger plug 3810 of the charger assembly 3800 is coupled (e.g., directly coupled, etc.) to the patch cable port 3876 of the patch cable assembly 3870 and the patch cable plug 3874 of the patch cable assembly 3870 is coupled (e.g., directly coupled, etc.) to the power distribution port 3712 of the power distribution unit 3710 to electrically couple the charger assembly 3800 to the patch cable assembly 3870 and the power distribution unit 3710, according to some embodiments. In the second configuration, the charger assembly 3800 may be positioned within the rearward section 3760 of the delivery vehicle 10. In the second configuration, the patch cable assembly 3870 is electrically coupled to the battery 3702, the power distribution unit 3710, and/or the charger assembly 3800. For example, in the second configuration, the patch cable plug 3874 may be coupled to the power distribution port 3712 and the patch cable port 3876 may be coupled to the charger plug 3810 to electrically couple the charger plug 3810 to the power distribution port 3712 through the patch cable assembly 3870. In the second configuration, the external connector 3900 may be coupled to the charger port 3830 proximate the forward section 3750 of the delivery vehicle 10. In various embodiments, in the second configuration, the charger plug 3810 of the second of the charger assemblies 3800 positioned in the rearward section 3760 of the delivery vehicle 10 is electrically coupled to the power distribution port 3712 while the charger plug 3810 of the first of the charger assemblies 3800 positioned in the forward section 3750 of the delivery vehicle 10 is not electrically coupled to the power distribution port 3712.

In some embodiments, in the second configuration, the charger port 3830 is coupled to a portion of the body 100 positioned in the rearward section 3760 by the charger port fasteners 3832. For example, the body 100 may define a second charger aperture (e.g., a second charger opening, etc.) configured to receive the charger port 3830 that is positioned in the rearward section 3760. In the second configuration, the charger port 3830 may extend through the second charger aperture and be coupled to the body 100 proximate the second charger aperture by the charger port fasteners 3832. For example, the body 100 may define a plurality of second fastener apertures proximate the second charger aperture configured to receive the charger port fasteners 3832 and the charger port fasteners 3832 may extend through the second fastener apertures to couple the charger port 3830 to the body 100. In various embodiments, the second charger aperture may be defined by the right side 18 or the left side 20 of the body 100. In other embodiments, the right side 18 of the body 100 may define a first of the second charger apertures and the left side of the body 100 may define a second of the second charger apertures such that in the second configuration the charger port 3830 may be positioned on the right side 18 or the left side 20. In some embodiments, the first charger aperture may be defined in the cargo body 400 of the body 100.

In operation, an operator (e.g., a driver, a maintenance technician, etc.) of the delivery vehicle 10 may alternate the delivery vehicle 10 between the first configuration of the delivery vehicle 10 where the charger assembly 3800 is positioned in the forward section 3750 of the delivery vehicle 10 to the second configuration of the delivery vehicle 10 by changing the configuration of the ESS 1300. The operator may alternate the delivery vehicle 10 between the first configuration and the second configuration without having to run cables (e.g., install cables, etc.) along a length of the delivery vehicle 10. For example, the operator may alternate the delivery vehicle 10 between the first configuration and the second configuration without running a cable between the forward section 3750 of the delivery vehicle 10 and the rearward section 3760 of the delivery vehicle 10.

For example, to change the delivery vehicle 10 from the first configuration to the second configuration, the operator may disconnect the charger plug 3810 from the power distribution port 3712, connect the patch cable plug 3874 to the power distribution port 3712, remove the charger assembly 3800 from the forward section 3750 of the delivery vehicle 10, install the charger assembly 3800 in the rearward section 3760 of the delivery vehicle 10, and connect the charger plug 3810 to the patch cable port 3876 to electrically couple the charger assembly 3800 to the battery 3702 through the patch cable assembly 3870 and the power distribution unit 3710. As another example, to change the delivery vehicle 10 from the first configuration to the second configuration when the delivery vehicle 10 includes a first of the charger assemblies 3800 positioned in the forward section 3750 of the delivery vehicle 10 and a second of the charger assemblies 3800 positioned in the rearward section 3760 of the delivery vehicle 10, the operator may disconnect the charger plug 3810 of the first of the charger assemblies 3800 positioned in the forward section 3750 of the delivery vehicle 10 from the power distribution port 3712 and connect the patch cable plug 3874 to the power distribution port 3712, where the patch cable port 3876 is coupled to the charger plug 3810 of the second of the charger assemblies 3800 positioned in the rearward section 3760 of the delivery vehicle 10, to electrically couple the second of the charger assemblies 3800 to the battery 3702 through the patch cable assembly 3870 and the power distribution unit 3710.

For example, to change the delivery vehicle 10 from the second configuration to the first configuration, the operator may disconnect the charger plug 3810 from the patch cable port 3876, remove the charger assembly 3800 from the rearward section 3760 of the delivery vehicle 10, disconnect the patch cable plug 3874 from the power distribution port 3712, install the charger assembly 3800 in the forward section 3750 of the delivery vehicle 10, and connect the charger plug 3810 to the power distribution port 3712 to electrically couple the charger assembly 3800 to the battery 3702 through the power distribution unit 3710 without passing through the patch cable assembly 3870. As another example, to change the delivery vehicle 10 from the second configuration to the first configuration when the delivery vehicle 10 includes a first of the charger assemblies 3800 positioned in the forward section 3750 of the delivery vehicle 10 and a second of the charger assemblies 3800 positioned in the rearward section 3760 of the delivery vehicle 10, the operator may disconnect the patch cable plug 3874 from the power distribution port 3712 and connect the charger plug 3810 of the first of the charger assemblies 3800 positioned in the forward section 3750 of the delivery vehicle 10 to the power distribution port 3712 to electrically couple the first of the charger assemblies 3800 to the battery 3702 through the power distribution unit 3710 without passing through the patch cable assembly 3870.

Figure 15:
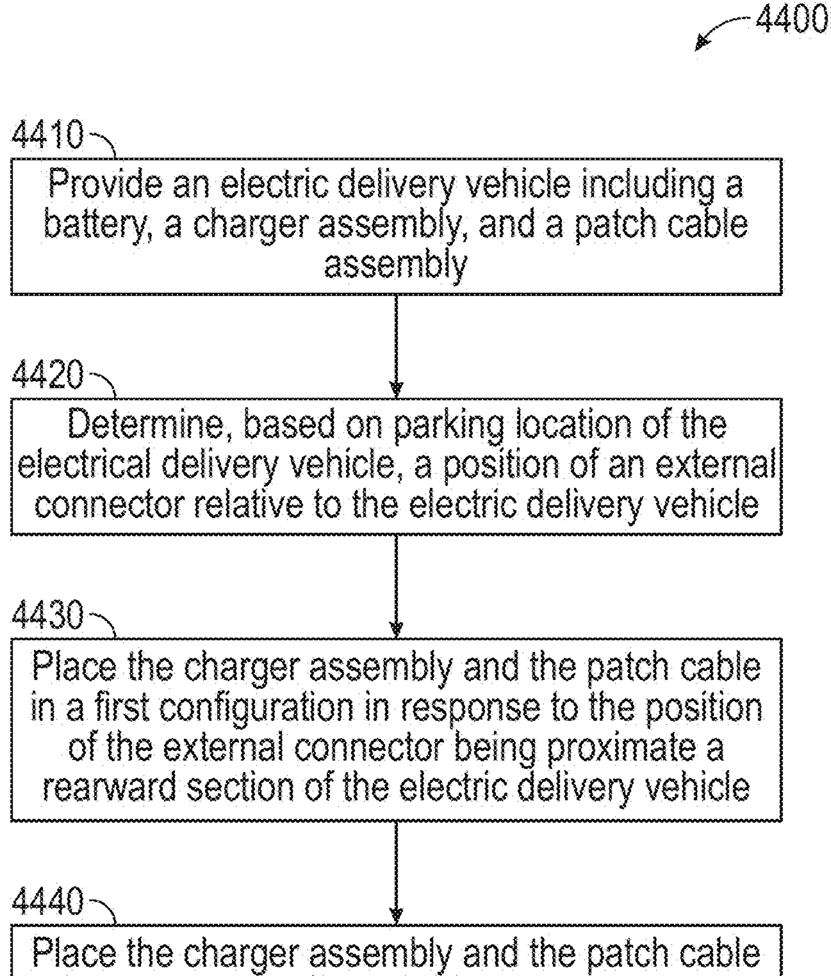
FIG. 15 is a flow diagram of a process for charging an electric delivery vehicle, according to an exemplary embodiment.

Referring to FIG. 15, a process 4400 for charging an electric delivery vehicle (e.g., charging a battery of an electric delivery vehicle, etc.) includes steps 4410-4420, according to some embodiments. The process 4400 may be performed, at least in part, by an operator of the delivery vehicle 10. In some embodiments, the process 4400 is performed by the operator of the delivery vehicle 10 such that the charger assembly 3800 is positioned in the rearward section 3760 of the delivery vehicle 10 so that the external connector 3900 positioned proximate the rearward section 3760 of the delivery vehicle 10 can engage the charger assembly 3800 to charge the battery 3702. In some embodiments, the process 4400 is performed by the operator of the delivery vehicle 10 such that the charger assembly 3800 is positioned in the forward section 3750 of the delivery vehicle 10 so that the external connector 3900 positioned proximate the forward section 3750 of the delivery vehicle 10 can engage the charger assembly 3800 to charge the battery 3702.

The process 4400 includes providing an electric delivery vehicle including a battery, a charger assembly, and a patch cable assembly (step 4410), according to some embodiments. In some embodiments, the electric delivery vehicle is the delivery vehicle 10 and includes the ESS 1300, which includes the battery 3702, the power distribution unit 3710, the patch cable assembly 3870, and the charger assembly 3800. In some embodiments, the delivery vehicle 10 may be provided with the ESS 1300 in the first configuration where the charger plug 3810 of the charger assembly 3800 is coupled to the power distribution port 3712 of the power distribution unit 3710 to electrically couple the charger assembly 3800 to the power distribution unit 3710 such that electricity received by the charger assembly 3800 and provided to the battery 3702 does not flow through the patch cable assembly 3870. When the ESS 1300 is provided in the first configuration, the charger assembly 3800 may be positioned in the forward section 3750 of the delivery vehicle 10.

In other embodiments, the delivery vehicle 10 may be provided with the ESS 1300 in the second configuration where the charger plug 3810 of the charger assembly 3800 is coupled to the patch cable port 3876 of the patch cable assembly 3870 and the patch cable plug 3874 of the patch cable assembly 3870 is coupled to the power distribution port 3712 of the power distribution unit 3710 to electrically couple the charger assembly 3800 to the power distribution unit 3710 such that electricity received by the charger assembly 3800 and provided to the battery 3702 flows through the patch cable assembly 3870. When the ESS 1300 is provided in the second configuration, the charger assembly 3800 may be positioned in the rearward section 3760 of the delivery vehicle 10. In still other embodiments, the delivery vehicle 10 may be provided with the ESS 1300 in an intermediate configuration where the charger assembly 3800 and the patch cable assembly 3870 are not coupled to the power distribution port 3712 of the power distribution unit 3710. When the ESS 1300 is provided in the intermediate configuration, the ESS 1300 may be transitioned from the intermediate configuration into the first configuration or the second configuration without the charger assembly 3800 or the patch cable assembly 3870 being decoupled from (e.g., unplugged from, etc.) the power distribution port 3712 of the power distribution unit 3710.

The process 4400 includes determining, based on a location of the electric delivery vehicle, a position of an external connector relative to the electric delivery vehicle (step 4420), according to some embodiments. The external connector may be configured to engage the charger assembly of the electric delivery vehicle to charge the battery of the electric delivery vehicle. In some embodiments, the location (e.g., a parking location, a idling location, etc.) of the electric delivery vehicle is a location where the electric delivery vehicle is parked (e.g., currently parked, etc.) and the position of the external connector relative to the electric delivery vehicle may be determined based on a current position of the external connector relative to the electric delivery vehicle. In other embodiments, the location of the electric delivery vehicle is a future location (e.g., a potential location, etc.) where the electric delivery vehicle may park in the future (e.g., will park in the future, etc.) and the position of the external connector relative to the electric delivery vehicle may be determined based on the position of the external connector relative to the electric delivery vehicle when the electric delivery vehicle is located at the future location.

In some embodiments, the external connector is the external connector 3900 configured to supply power to the battery 3702 of the delivery vehicle 10. The position of the external connector 3900 may be determined based on the orientation of the external connector 3900 relative to the delivery vehicle 10 when the delivery vehicle 10 is positioned at the parking location. In some embodiments, the position of the external connector 3900 relative to the delivery vehicle 10 may be determined based on a range of the external connector 3900. For example, if the external connector 3900 is electrically coupled to an external cable, the position of the external connector 3900 may include all of the positions that the external connector 3900 may reach based on a length of the external cable. In some embodiments, the position of the external connector 3900 may be relative to the forward section 3750 or the rearward section 3760 of the delivery vehicle 10.

The process 4400 includes placing the charger assembly and the patch cable in a first configuration in response to the position of the external connector being proximate a forward section of the electric delivery vehicle (step 4430), according to some embodiments. When the charger assembly and the patch cable are in the first configuration, the charger assembly is positioned in the forward section of the electric delivery vehicle such that the external connector may engage the charger assembly to provide electric power to the battery to charge the battery. In some embodiments, when the charger assembly and the patch cable are placed in the first configuration, the charger assembly is electrically coupled to the battery without being electrically coupled to the battery through the patch cable. For example, in the first configuration, the charger assembly may receive the electric power from the external connector and may provide the electric power to the battery without the electric power flowing through the patch cable.

In some embodiments, the ESS 1300 may be placed in the first configuration in response to the position of the external connector 3900 being proximate the forward section 3750 of the delivery vehicle 10. The external connector 3900 may be proximate the forward section 3750 of the delivery vehicle 10 when the external connector 3900 can engage the charger assembly 3800 when the ESS 1300 is in the first configuration (e.g., when the charger assembly 3800 is positioned in the forward section 3750 of the delivery vehicle 10, etc.). When the ESS 1300 is placed in the first configuration, the charger plug 3810 of the charger assembly 3800 is coupled to the power distribution port 3712 of the power distribution unit 3710 to electrically couple the charger assembly 3800 to the power distribution unit 3710 such that electricity received by the charger assembly 3800 and provided to the battery 3702 does not flow through the patch cable assembly 3870.

The process 4400 includes placing the charger assembly and the patch cable in a second configuration in response to the position of the external connector being proximate a rearward section of the electric delivery vehicle (step 4440), according to some embodiments. When the charger assembly and the patch cable are in the second configuration, the charger assembly is positioned in the rearward section of the electric delivery vehicle such that the external connector may engage the charger assembly to provide electric power to the battery to charge the battery. In some embodiments, when the charger assembly and the patch cable are placed in the second configuration, the charger assembly is electrically coupled to the battery through the patch cable. For example, in the second configuration, the charger assembly may receive the electric power from the external connector and may provide the electric power to the battery through the patch cable.

In some embodiments, the ESS 1300 may be placed in the second configuration in response to the position of the external connector 3900 being proximate the rearward section 3760 of the delivery vehicle 10. The external connector 3900 may be positioned proximate the rearward section 3760 of the delivery vehicle 10 when the external connector 3900 can engage the charger assembly 3800 when the ESS 1300 is in the second configuration (e.g., when the charger assembly 3800 is positioned in the rearward section 3760 of the delivery vehicle 10, etc.). When the ESS 1300 is placed in the second configuration, the charger plug 3810 of the charger assembly 3800 is coupled to the patch cable port 3876 of the patch cable assembly 3870 and the patch cable plug 3874 of the patch cable assembly 3870 is coupled to the power distribution port 3712 of the power distribution unit 3710 to electrically couple the charger assembly 3800 to the power distribution unit 3710 such that the electricity received by the charger assembly 3800 and provided to the battery 3702 flows through the patch cable assembly 3870.

One solution to coupling a charger assembly to a body of a delivery vehicle is to couple the charger assembly to the body at a fixed location. Due to differences between a plurality of delivery facilities and/or charging stations (e.g., locations where the delivery vehicle may park, locations where the battery of the delivery vehicle may be charged, etc.), an external connector for charging the delivery vehicle may be located at different positions relative to a parking spot for the delivery vehicle at the plurality of delivery facilities. For example, at a first delivery facility the external connector may be located proximate a front portion of the parking spot and at a second delivery facility the external connector may be located proximate a rear portion of the parking spot. This may necessitate a driver of the delivery vehicle to park the delivery vehicle in an inconvenient orientation in the parking spot so that the external connector may reach the charger assembly, which may result in additional time required to park the delivery vehicle and a greater chance of an accidental collision. For example, if the external connector is located proximate the front portion of the delivery vehicle and the charger assembly is positioned in a rearward section of the delivery vehicle, the operator of the delivery vehicle may have to back the delivery vehicle into the parking space in order to be able to charger the battery of the delivery vehicle. Additionally, the inconvenient orientation of the delivery vehicle may make it more difficult to load or unload the delivery vehicle. For example, in the inconvenient orientation a rear cargo opening and/or a side cargo opening leading to a cargo compartment of the delivery vehicle may not be aligned with a loading dock (e.g., a loading area, etc.), which may result in additional time required to load and/or unload the delivery vehicle.

Another solution to coupling a charger assembly to a body of a delivery vehicle is to couple multiple charger assemblies at multiple locations on the body of the delivery vehicle. For example, a first of the charger assemblies may be positioned in a forward section of the delivery vehicle and a second of the charger assemblies may be positioned in a rearward section of the delivery vehicle. Each of the charger assemblies must be connected to a power distribution unit in order to function as chargers for a battery of the delivery vehicle. The power distribution unit would require multiple ports to interface with each of the multiple charger assemblies, which would increase the manufacturing cost and the foot print of the power distribution unit. For example, when the delivery vehicle includes two of the charger assemblies, the power distribution unit would need to include a first power distribution unit port configured to receive the first of the charger assemblies and a second power distribution unit port configured to receive the second of the charger assemblies.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the delivery vehicle 10 and the systems and components thereof as shown in the various exemplary embodiments is illustrative only. Additionally, any element disclosed in one embodiment may be incorporated or utilized with any other embodiment disclosed herein.

The invention claimed is:

1. An electric delivery vehicle comprising:

a frame;

an energy storage system ("ESS") comprising:

a battery assembly comprising a plurality of batteries;

a power distribution unit electrically coupled to the battery assembly, the power distribution unit having a first interface electrically coupled to the battery assembly;

a patch cable configured to engage the first interface of the power distribution unit to electrically couple the patch cable to the battery assembly, the patch cable having a second interface; and a charger assembly configured to receive an external connector configured to supply power to the battery assembly, the charger assembly configured to separately engage the first interface of the power distribution unit to electrically couple the charger assembly to the battery assembly and the second interface of the patch cable to electrically couple the charger assembly to the patch cable; and an electric motor configured to consume electrical energy provided by the plurality of batteries of the ESS.

2. The electric delivery vehicle of claim 1, wherein in a first configuration of the ESS, the charger assembly engages the first interface of the power distribution unit such that the charger assembly is electrically coupled to the battery assembly; and wherein in a second configuration of the ESS, the charger assembly engages the second interface of the patch cable and the patch cable engages the first interface of the power distribution unit such that the charger assembly is electrically coupled to the battery assembly through the patch cable.

3. The electric delivery vehicle of claim 2, wherein the electric delivery vehicle defines a forward section and a rearward section;

wherein in the first configuration the charger assembly is positioned in the forward section; and wherein in the second configuration the charger assembly and the second interface of the patch cable are positioned in the rearward section.

4. The electric delivery vehicle of claim 1, wherein at least a portion of the patch cable extend in a direction parallel to a direction of travel of the electric delivery vehicle; and wherein the portion of the patch cable is positioned in both a forward section and a rearward section of the electric delivery vehicle.

5. The electric delivery vehicle of claim 4, wherein the portion of the patch cable is coupled to at least one of the frame or the battery assembly.

6. The electric delivery vehicle of claim 1, wherein the battery assembly is positioned in both a forward section and a rearward section of the electric delivery vehicle.

7. The electric delivery vehicle of claim 1, wherein the electric delivery vehicle further comprises:

a front axle having a first plurality of tractive elements; and a rear axle having a second plurality of tractive elements, the rear axle positioned rearward of the front axle;

wherein the electric motor is configured to drive at least one of the front axle or the rear axle to move the electric delivery vehicle.

8. The electric delivery vehicle of claim 1, wherein:

the power distribution unit comprises a first port defining the first interface;

the patch cable comprises:

a first plug configured to engage the first port, the first plug positioned on a first end of the patch cable; and a second port defining the second interface, the second port positioned on a second end of the patch cable opposing the first end of the patch cable; and the charger assembly comprises:

a second plug configured to engage the first port and the second port; and a third port configured to receive the external connector.

9. The electric delivery vehicle of claim 8, wherein the electric delivery vehicle defines a forward section and a rearward section;

wherein the first plug of the patch cable is positioned in the forward section; and wherein the second port of the patch cable is positioned in the rearward section.

10. The electric delivery vehicle of claim 8, wherein in a first configuration of the ESS, the second plug of the charger assembly engages the first port of the power distribution unit; and wherein in a second configuration of the ESS the second plug of the charger assembly engages the second port of the patch cable and the first plug of the patch cable engages the first port of the power distribution unit.

11. The electric delivery vehicle of claim 9, wherein a portion of the patch cable extends in a direction parallel to a direction of travel of the electric delivery vehicle.

12. The electric delivery vehicle of claim 11, wherein the battery assembly is positioned in the forward section.

13. An energy storage system ("ESS") for an electric delivery vehicle, the ESS comprising:

a battery assembly comprising a plurality of batteries;

a power distribution unit electrically coupled to the battery assembly, the power distribution unit comprising a first port electrically coupled to the battery assembly;

a patch cable configured to be electrically coupled to the power distribution unit, the patch cable comprising:

a first plug configured to engage the first port to electrically couple the patch cable to the battery assembly, the first plug positioned on a first end of the patch cable; and a second port positioned on a second end of the patch cable, the second port electrically coupled to the first port; and a charger assembly configured to be electrically coupled to the power distribution unit, the charger assembly comprising:

a second plug configured to engage (i) the first port to electrically couple the charger assembly to the power distribution unit and (ii) the second port to electrically couple the charger assembly to the patch cable; and a third port configured to receive an external connector configured to supply power to the battery assembly.

14. The ESS of claim 13, wherein in a first configuration of the ESS, the second plug of the charger assembly engages the first port of the power distribution unit such that the charger assembly is electrically coupled to the battery assembly; and wherein in a second configuration of the ESS, the second plug of the charger assembly engages the second port of the patch cable and the first plug of the patch cable engages the first port of the power distribution unit such that the charger assembly is electrically coupled to the battery assembly through the patch cable.

15. The ESS of claim 14, wherein the ESS defines a forward section positioned forward of a forward surface of the battery assembly and a rearward section positioned rearward of the forward surface of the battery assembly;

wherein in the first configuration the charger assembly is positioned in the forward section; and wherein in the second configuration the charger assembly is positioned in the rearward section.

16. A method of charging an electric delivery vehicle, the method comprising:

determining, based on a location of the electric delivery vehicle, a position of an external connector relative to the electric delivery vehicle, the external connector configured to engage a charger of the electric delivery vehicle to supply power to a battery of the electric delivery vehicle, wherein the electric delivery vehicle comprises a patch cable configured to selectively electrically couple the charger to the battery;

responsive to determining that the external connector is positioned proximate a forward section of the electric delivery vehicle, placing the charger and the patch cable in a first configuration to electrically couple the charger to the battery without electrically coupling the charger to the battery through the patch cable; and responsive to determining that the external connector is positioned proximate a rearward section of the electric delivery vehicle positioned rearward of the forward section of the electric delivery vehicle, placing the charger and the patch cable in a second configuration to electrically couple the charger to the battery through the patch cable.

17. The method of claim 16, wherein in the first configuration the charger is positioned in the forward section of the electric delivery vehicle; and wherein in the second configuration the charger is positioned in the rearward section of the electric delivery vehicle.

18. The method of claim 16, wherein prior to determining the position of the external connector relative to the electric delivery vehicle, the charger and the patch cable are placed in an intermediate configuration where the charger and the patch cable are not electrically coupled to the battery.

19. The method of claim 16, wherein at least a portion of the patch cable extend in a direction parallel to a direction of travel of the electric delivery vehicle; and wherein the portion of the patch cable is positioned in both the forward section and the rearward section of the electric delivery vehicle when the patch cable is in the first configuration or the second configuration.

20. The method of claim 16, wherein the battery is positioned in both the forward section and the rearward section of the electric delivery vehicle.

* * * * *